United States Patent
Ishizaka et al.

(10) Patent No.: US 7,654,108 B2
(45) Date of Patent: Feb. 2, 2010

(54) UNIT FOR REFRIGERANT CYCLE DEVICE

(75) Inventors: Naohisa Ishizaka, Okazaki (JP); Thuya Aung, Kariya (JP); Hiroshi Oshitani, Toyota (JP); Yoshiaki Takano, Kosai (JP); Mika Gocho, Obu (JP); Hirotsugu Takeuchi, Nagoya (JP); Yoshiyuki Okamoto, Nagoya (JP)

(73) Assignee: Denso Corporation, Kariya (JP)

( * ) Notice: Subject to any disclaimer, the term of this patent is extended or adjusted under 35 U.S.C. 154(b) by 292 days.

(21) Appl. No.: 11/654,206

(22) Filed: Jan. 17, 2007

(65) Prior Publication Data
US 2007/0169510 A1    Jul. 26, 2007

(30) Foreign Application Priority Data
Jan. 20, 2006    (JP)    ............... 2006-012461

(51) Int. Cl.
*F25B 1/06*    (2006.01)
*F25B 39/02*    (2006.01)
*F28D 1/02*    (2006.01)
*F28F 1/32*    (2006.01)

(52) U.S. Cl. .............. 62/500; 62/515; 62/524; 165/153; 165/172; 165/173; 165/174

(58) Field of Classification Search .............. 62/500, 62/524–527; 165/174–176
See application file for complete search history.

(56) References Cited

U.S. PATENT DOCUMENTS 3,705,622 A    12/1972    Schwarz
6,065,573 A    5/2000    Kelly
6,161,616 A    12/2000    Haussmann (Continued)

FOREIGN PATENT DOCUMENTS

CH    1283261    2/2001

(Continued)

OTHER PUBLICATIONS

U.S. Appl. No. 11/654,315, filed Jan. 17, 2007, Ishizaka et al.

(Continued)

*Primary Examiner*—Frantz F Jules
*Assistant Examiner*—Cassey Bauer
(74) *Attorney, Agent, or Firm*—Harness, Dickey & Pierce, PLC

(57) ABSTRACT

A unit for a refrigerant cycle device includes an ejector that has a nozzle part which decompresses refrigerant, and a refrigerant suction port from which refrigerant is drawn by a high-speed refrigerant flow jetted from the nozzle part, a first evaporator connected to the outlet of the ejector, and a second evaporator connected to the refrigerant suction port of the ejector. One of the first evaporator and the second evaporator has a tank structure that includes a tank for distributing refrigerant into or for collecting the refrigerant from refrigerant passages of a heat exchanging part. The tank has therein a first space through which the refrigerant discharged from the outlet of the ejector flows into a heat exchanging part of the first evaporator, and a second space through which the refrigerant to be drawn into the refrigerant suction port flows into a heat exchanging part of the second evaporator.

28 Claims, 16 Drawing Sheets

U.S. PATENT DOCUMENTS

| | | |
|---|---|---|
| 6,260,379 B1 | 7/2001 | Manwill et al. |
| 6,477,857 B2 | 11/2002 | Takeuchi et al. |
| 6,574,987 B2 * | 6/2003 | Takeuchi et al. .............. 62/500 |
| 7,178,359 B2 | 2/2007 | Oshitani et al. |
| 7,254,961 B2 | 8/2007 | Oshitani et al. |
| 2004/0159121 A1 * | 8/2004 | Horiuchi et al. .............. 62/526 |
| 2005/0039895 A1 | 2/2005 | Inaba et al. |
| 2005/0178150 A1 | 8/2005 | Oshitani et al. |
| 2005/0268644 A1 * | 12/2005 | Oshitani et al. .............. 62/500 |
| 2007/0163294 A1 | 7/2007 | Aung et al. |

FOREIGN PATENT DOCUMENTS

| | | |
|---|---|---|
| JP | 06-137695 | 5/1994 |
| WO | WO 2006/109617 | 10/2006 |

OTHER PUBLICATIONS

U.S. Appl. No. 11/654,316, filed Jan. 17, 2007, Ishizaka et al.

Office action dated Sep. 23, 2008 in German Application No. 10 2007 002549.3.

Office action dated Jun. 6, 2008 in Chinese Application No. 2006 10165935.0.

Office action dated Jun. 20, 2008 in Chinese Application No. 2006 10165933.1.

Office Action issued from U.S. Patent Office dated Feb. 5, 2009 in the related U.S. Appl. No. 11/653,622.

Office Action issued from U.S. Patent Office dated Aug. 31, 2009 in the corresponding U.S. Appl. No. 11/654,316.

* cited by examiner

UNIT FOR REFRIGERANT CYCLE DEVICE

CROSS REFERENCE TO RELATED APPLICATION

This application is based on Japanese Patent Application No. 2006-12461 filed on Jan. 20, 2006, the contents of which are incorporated herein by reference in its entirety.

FIELD OF THE INVENTION

The present invention relates to a unit for a refrigerant cycle device (ejector refrigerant cycle device), which has an ejector having a function for decompressing refrigerant and a function for circulating the refrigerant.

BACKGROUND OF THE INVENTION

An ejector refrigerant cycle device is known which includes an ejector serving as refrigerant decompression means and refrigeration circulating means. The ejector refrigerant cycle device is useful for, for example, a vehicle air conditioner, or a vehicle refrigeration system for refrigerating and freezing loads on a vehicle, or the like. The refrigeration cycle is also useful for a fixed refrigeration cycle system, such as an air conditioner, a refrigerator, or a freezer.

JP-B2-3265649 describes an ejector refrigerant cycle device which includes a first evaporator disposed at an outlet side of an ejector, a gas-liquid separator located at a refrigerant outlet side of the first evaporator, and a second evaporator located between a liquid refrigerant outlet side of the gas-liquid separator and a refrigerant suction port of the ejector.

In the ejector refrigerant cycle device described in JP-B2-3265649, the refrigerant discharged from an outlet of the ejector is distributed into a plurality of tubes of the first evaporator by using a distributor, and liquid refrigerant flowing out of the gas-liquid separator is distributed into a plurality of tubes of the second evaporator. However, in this case, piping structure (refrigerant passage structure) for distributing refrigerant to the tubes of the first and second evaporators becomes difficult.

SUMMARY OF THE INVENTION

In view of the foregoing problems, it is an object of the present invention to simplify a piping structure in a refrigerant cycle device.

It is another object of the present invention to provide a unit for a refrigerant cycle device, which can simplify a passage structure.

According to an aspect of the present invention, a unit for a refrigerant cycle device includes an ejector that has a nozzle part which decompresses refrigerant, and a refrigerant suction port from which refrigerant is drawn by a high-speed refrigerant flow jetted from the nozzle part. Here, the refrigerant jetted from the nozzle part and the refrigerant drawn from the refrigerant suction port are mixed and discharged from an outlet of the ejector. The unit further includes a first evaporator connected to the outlet of the ejector, and a second evaporator connected to the refrigerant suction port of the ejector. The first evaporator has a heat exchanging part for evaporating the refrigerant flowing out of the outlet of the ejector, and the second evaporator has a heat exchanging part for evaporating the refrigerant to be drawn into the refrigerant suction port.

In the unit, one of the first evaporator and the second evaporator has a tank structure that includes a tank for distributing refrigerant into a plurality of refrigerant passages of the heat exchanging part or for collecting the refrigerant from the refrigerant passages, and the tank has therein a first space into which the refrigerant discharged from the outlet of the ejector flows, and a second space into which the refrigerant to be drawn into the refrigerant suction port flows. In addition, the first space and the second space are partitioned from each other in the tank and are provided such that the refrigerant discharged from the outlet of the ejector flows into the heat exchanging part of the first evaporator via the first space, and the refrigerant to be drawn to the refrigerant suction port flows into the heat exchanging part of the second evaporator via the second space. Accordingly, by using the tank structure provided in one of the first and second evaporators, a refrigerant passage on the side of the outlet of the ejector and a refrigerant passage on the side of the refrigerant suction port of the ejector can be connected. Furthermore, a distribution function for distributing the refrigerant from the outlet of the ejector and for distributing the refrigerant to be drawn into the refrigerant suction port is provided. Therefore, a passage structure of the unit for the refrigerant cycle device can be made simple.

For example, the second evaporator has the tank structure. In this case, the first space is provided with a communication hole communicating with the first evaporator such that the refrigerant flowing from the outlet of the ejector into the first space flows toward the first evaporator through the communication hole. Here, the communication hole may have a plurality of hole parts that are arranged in a flow direction of the refrigerant flowing into the first space from the outlet of the ejector. Alternatively, the communication hole may be elongated in a flow direction of the refrigerant flowing into the first space from the outlet of the ejector.

Alternatively, the second space may have one space part extending in an arrangement direction of the refrigerant passages of the heat exchanging part of the second evaporator at a position adjacent to the refrigerant passages of the heat exchanging part of the second evaporator, and the first space may be provided on a side opposite to the refrigerant passages of the heat exchanging part of the second evaporator with respect to the one space part of the second space. Furthermore, the second space may have another space part extending from the one space part to a position on an extending line of the first space.

The tank structure may further include a partition plate that is disposed within the tank to partition an inner space of the tank into the first space and the second space. In this case, the partition plate may include a plate surface part facing the refrigerant passages, and a flexed plate flexed from the plate surface part of the partition plate to the side opposite to the refrigerant passages of the heat exchanging part of the second evaporator. In this case, the first and second spaces are partitioned from each other by the plate surface part and the flexed plate.

In the unit for the refrigerant cycle device, the ejector may be located in the tank, the outlet of the ejector may be opened in the first space of the tank, and the plate surface part may have a recess recessed toward the second space for smoothly flowing the refrigerant from the outlet of the ejector to the first space of the tank.

Alternatively, the second space may be provided with an inlet port for introducing therein the refrigerant to be drawn into the suction port of the ejector, and a throttle mechanism may be located at an upstream side of the inlet port in a refrigerant flow for decompressing the refrigerant. In this case, the throttle mechanism may be incorporated in the integrated unit.

This unit can be suitably modified and can be used for any a refrigerant cycle device.

BRIEF DESCRIPTION OF THE DRAWINGS

Additional objects and advantages of the present invention will be more readily apparent from the following detailed description of embodiments when taken together with the accompanying drawings. In the drawings.

DETAILED DESCRIPTION OF THE PREFERRED EMBODIMENTS

First Embodiment

A first embodiment of the invention and examples of the first embodiment will be described below with reference to FIGS. 1 to 18. In the embodiment, a unit for an ejector refrigerant cycle device and an ejector refrigerant cycle device using the unit will be now described. For example, the unit is an evaporator unit or an ejector-equipped evaporator unit, for a refrigerant cycle.

This unit is connected to other components of the refrigeration cycle, including a condenser, a compressor, and the like, via piping to constitute a refrigerant cycle device including an ejector. The unit of the embodiment is used for application to an indoor equipment (i.e., evaporator) for cooling air. The unit may be used as an outdoor equipment in other embodiments.

Figure 1:
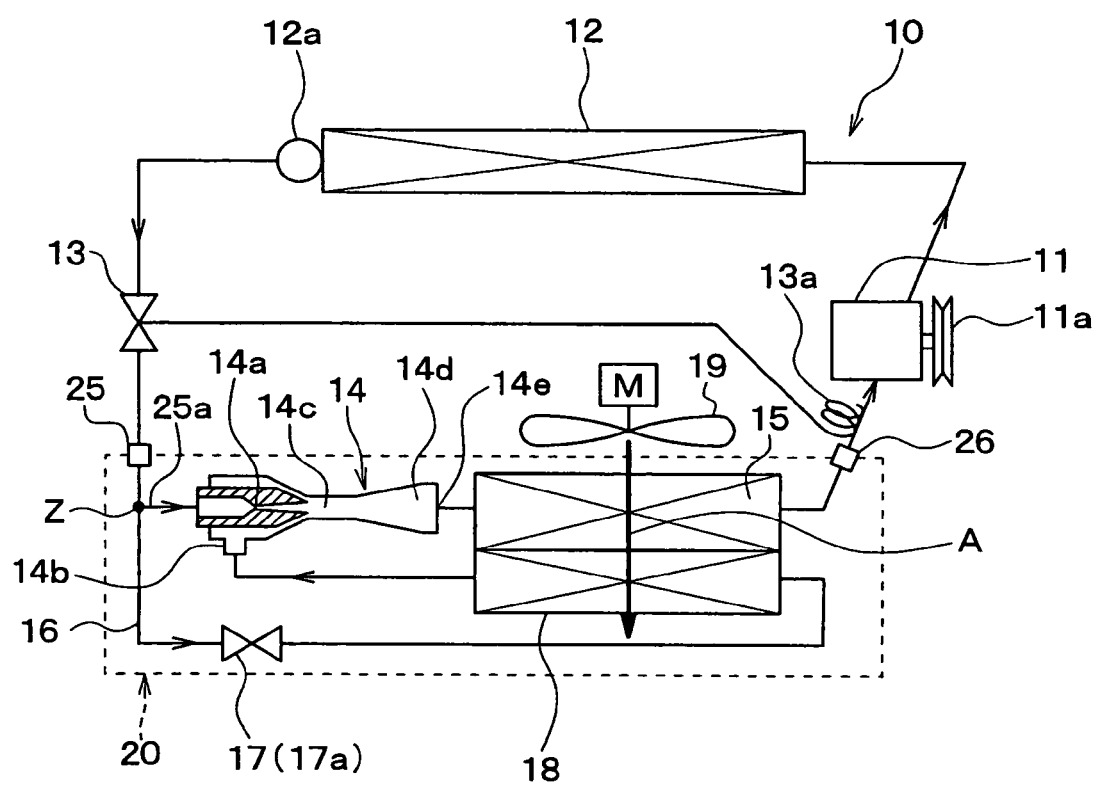
FIG. 1 is a refrigerant circuit diagram of an ejector refrigerant cycle device for a vehicle according to a first embodiment of the invention.

In an ejector refrigerant cycle device 10 shown in FIG. 1, a compressor 11 for drawing and compressing refrigerant is driven by an engine for vehicle traveling (not shown) via an electromagnetic clutch 11a, a belt, or the like.

As the compressor 11, may be used either a variable displacement compressor which can adjust a refrigerant discharge capability by a change in discharge capacity, or a fixed displacement compressor which can adjust a refrigerant discharge capability by changing an operating ratio of the compressor through engagement and disengagement of an electromagnetic clutch 11a. If an electric compressor is used as the compressor 11, the refrigerant discharge capability can be adjusted or regulated by adjustment of the number of revolutions of an electric motor.

A radiator 12 is disposed on a refrigerant discharge side of the compressor 11. The radiator 12 exchanges heat between the high-pressure refrigerant discharged from the compressor 11 and an outside air (i.e., air outside a compartment of a vehicle) blown by a cooling fan (not shown) thereby to cool the high-pressure refrigerant.

As the refrigerant for the ejector refrigerant cycle device 10 in the embodiment, is used a refrigerant whose high pressure does not exceed a critical pressure, such as a flon-based refrigerant, or a HC-based refrigerant, so as to form a vapor-compression subcritical cycle. Thus, the radiator 12 serves as a condenser for cooling and condensing the refrigerant.

A liquid receiver 12a is provided at a refrigerant outlet side of the radiator 12. The liquid receiver 12a has an elongated tank-like shape, as is known in the art, and constitutes a vapor-liquid separator for separating the refrigerant into vapor and liquid phases to store therein an excessive liquid refrigerant of the refrigerant cycle. At a refrigerant outlet of the liquid receiver 12a, the liquid refrigerant is derived from the lower part of the interior in the tank-like shape. In the embodiment, the liquid receiver 12a is integrally formed with the radiator 12.

The radiator 12 may have a known structure which includes a first heat exchanger for condensation positioned on the upstream side of a refrigerant flow, the liquid receiver 12a for allowing the refrigerant introduced from the first heat exchanger for condensation and for separating the refrigerant into vapor and liquid phases, and a second heat exchanger for supercooling the saturated liquid refrigerant from the liquid receiver 12a.

A thermal expansion valve 13 is disposed on an outlet side of the liquid receiver 12a. The thermal expansion valve 13 is a decompression unit for decompressing the liquid refrigerant from the liquid receiver 12a, and includes a temperature sensing part 13a disposed in a refrigerant suction passage of the compressor 11.

The thermal expansion valve 13 detects a degree of superheat of the refrigerant at the compressor suction side based on the temperature and pressure of the suction side refrigerant of the compressor 11, and adjusts an opening degree of the valve (refrigerant flow rate) such that the superheat degree of the refrigerant on the compressor suction side becomes a predetermined value which is preset, as is known in the art.

An ejector 14 is disposed at a refrigerant outlet side of the thermal expansion valve 13. The ejector 14 is decompression means for decompressing the refrigerant as well as refrigerant circulating means (kinetic vacuum pump) for circulating the refrigerant by a suction effect (entrainment effect) of the refrigerant flow ejected at high speed.

The ejector 14 includes a nozzle part 14a for further decompressing and expanding the refrigerant (the middle-pressure refrigerant) by restricting a path area of the refrigerant having passed through the expansion valve 13 to a small level, and a refrigerant suction port 14b disposed in the same space as a refrigerant jet port of the nozzle part 14a for drawing the vapor-phase refrigerant from a second evaporator 18 as described later.

A mixer 14c is provided on the downstream side part of the refrigerant flow of the nozzle part 14a and the refrigerant suction part 14b, for mixing a high-speed refrigerant flow from the nozzle part 14a and a sucked refrigerant from the refrigerant suction port 14b. A diffuser 14d serving as a pressure-increasing portion is provided on the downstream side of the refrigerant flow of the mixer 14c. The diffuser 14d is formed in such a manner that a path area of the refrigerant is generally increased toward downstream from the mixer 14c. The diffuser 14d serves to increase the refrigerant pressure by decelerating the refrigerant flow, that is, to convert the speed energy of the refrigerant into the pressure energy.

A first evaporator 15 is connected to an outlet 14e (the tip end of the diffuser 14d) of the ejector 14. The outlet side of the first evaporator 15 is connected to a suction side of the compressor 11.

On the other hand, a refrigerant branch passage 16 is provided to be branched from an inlet side of the ejector 14. That is, the refrigerant branch passage 16 is branched at a position between the refrigerant outlet of the thermal expansion valve 13 and the refrigerant inlet of the nozzle part 14a of the ejector 14. The downstream side of the refrigerant branch passage 16 is connected to the refrigerant suction port 14b of the ejector 14. A point Z indicates a branch point of the refrigerant branch passage 16.

In the refrigerant branch passage 16, a throttle 17 is disposed. On the refrigerant flow downstream side away from the throttle 17, a second evaporator 18 is disposed. The throttle 17 serves as a decompression unit which performs a function of adjusting a refrigerant flow rate into the second evaporator 18. More specifically, the throttle 17 can be constructed with a fixed throttle, such as a capillary tube, or an orifice.

In the first embodiment, two evaporators 15 and 18 are incorporated into an integrated structure with an arrangement as described later. These two evaporators 15 and 18 are accommodated in a case not shown, and the air (air to be cooled) is blown by a common electric blower 19 through an air passage formed in the case in the direction of an arrow "A", so that the blown air is cooled by the two evaporators 15 and 18.

The cooled air by the two evaporators 15 and 18 is fed to a common space to be cooled (not shown). This causes the two evaporators 15 and 18 to cool the common space to be cooled. Among these two evaporators 15 and 18, the first evaporator 15 connected to a main flow path on the downstream side of the ejector 14 is disposed on the upstream side (upwind side) of the air flow A, while the second evaporator 18 connected to the refrigerant suction port 14b of the ejector 14 is disposed on the downstream side (downwind side) of the air flow A.

When the ejector refrigerant cycle device 10 of the embodiment is used as a refrigeration cycle for a vehicle air conditioner, the space within the vehicle compartment is a space to be cooled. When the ejector refrigerant cycle device 10 of the embodiment is used for a refrigeration cycle for a freezer car, the space within the freezer and refrigerator of the freezer car is the space to be cooled.

In the embodiment, the ejector 14, the first and second evaporators 15 and 18, and the throttle 17 are incorporated into one integrated unit 20. Now, specific examples of the integrated unit 20 will be described below in detail with reference to FIGS. 2 to 10.

Figure 2:
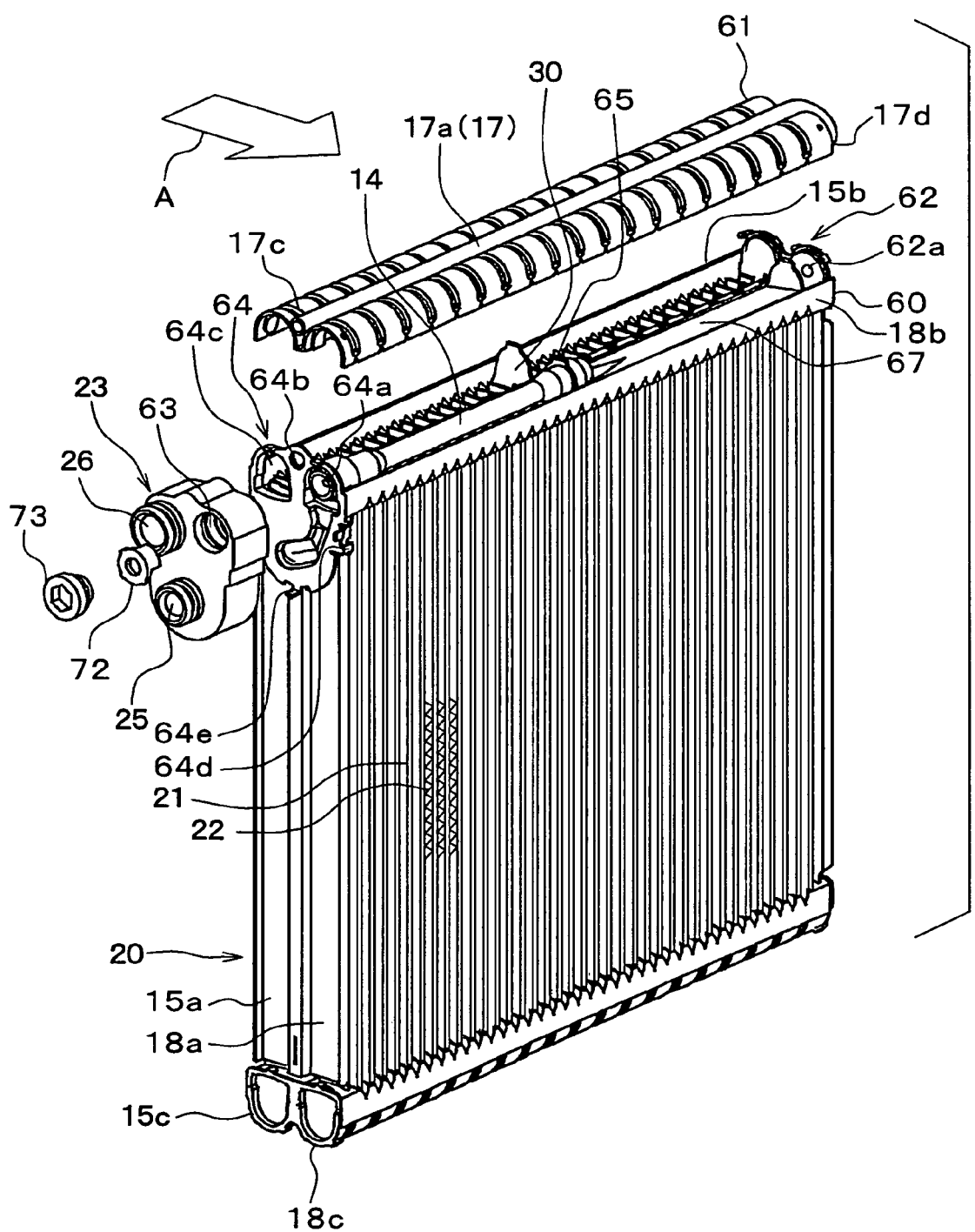
FIG. 2 is an exploded perspective view showing a schematic structure of an integrated unit for the ejector refrigerant cycle device in the first embodiment.
Figure 3:
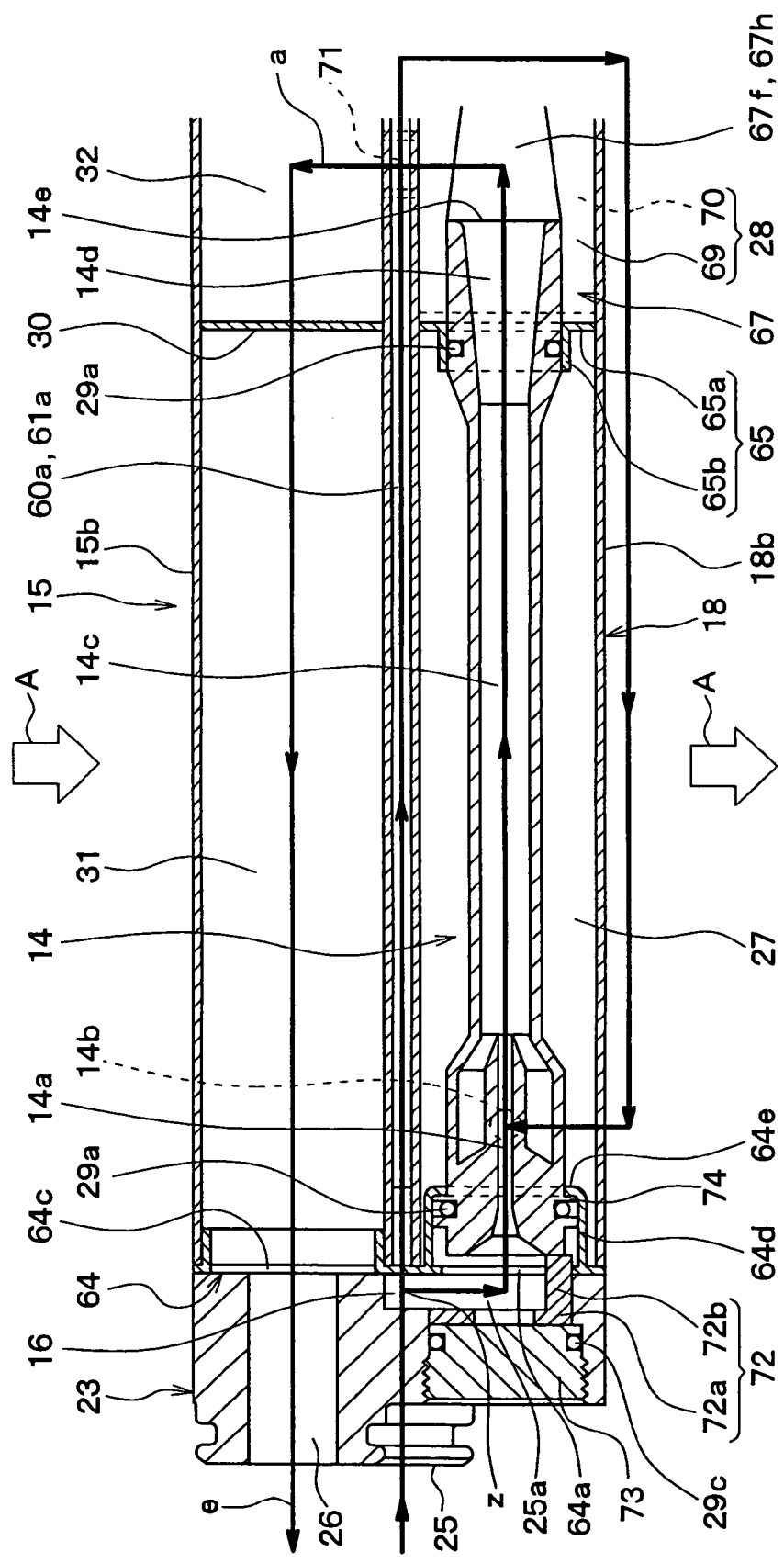
FIG. 3 is a schematic cross-sectional view of an evaporator tank in the integrated unit of FIG. 2.
Figure 4:
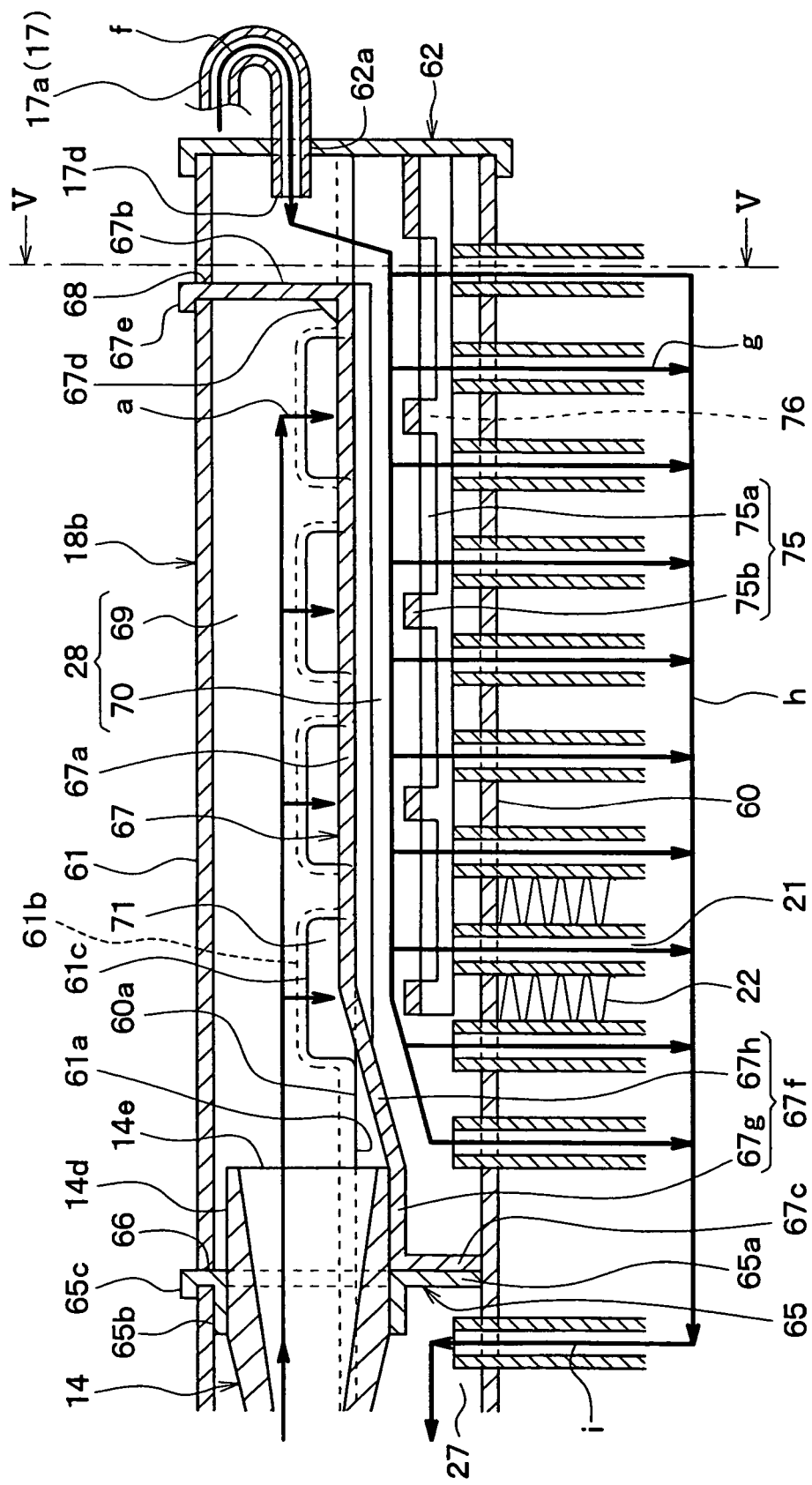
FIG. 4 is a longitudinal sectional view of the evaporator tank in the integrated unit of FIG. 2.
Figure 5:
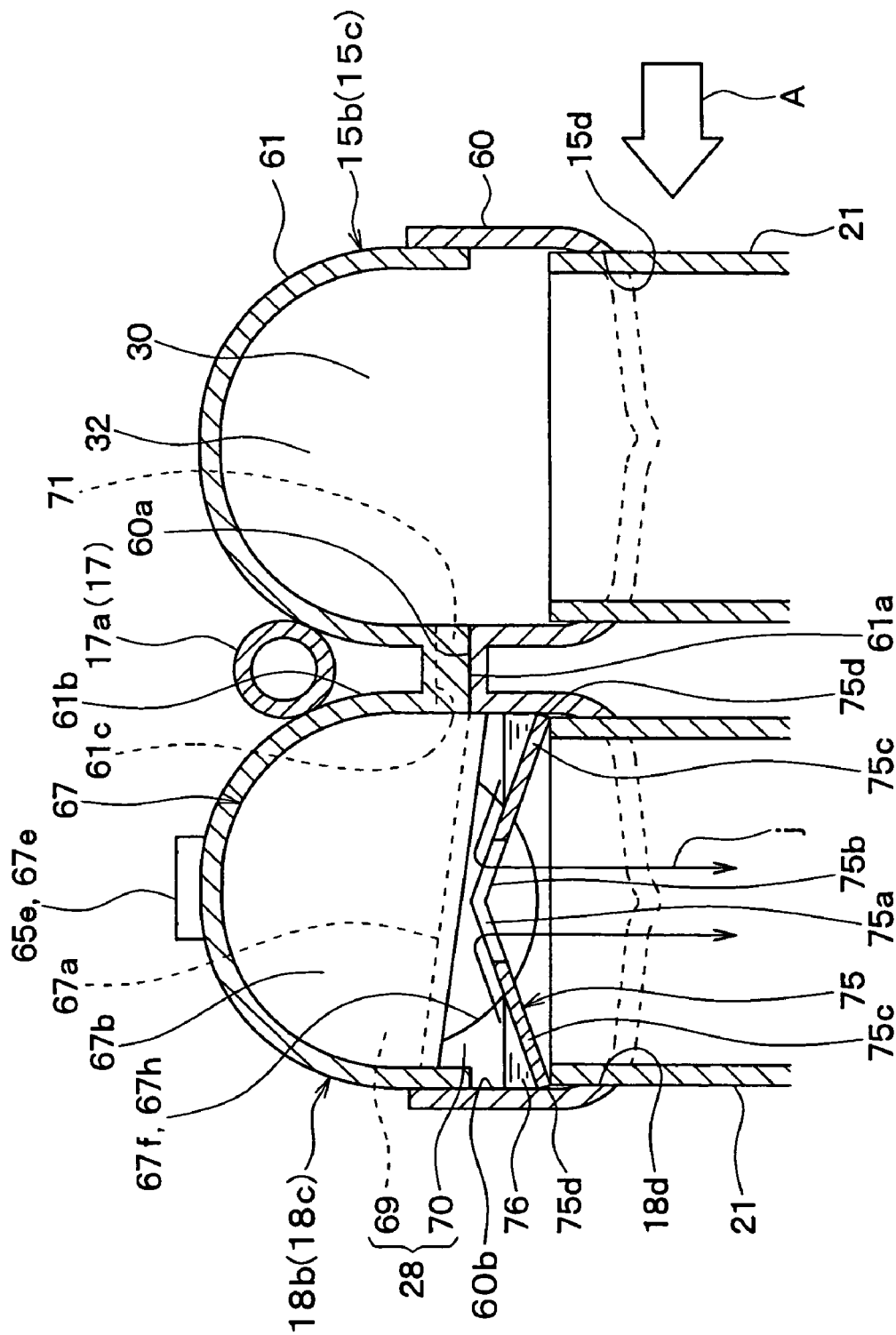
FIG. 5 is an enlarged sectional view taken along the line V-V of FIG. 4.

FIG. 2 is an exploded perspective view showing the entire schematic structure of the first and second evaporators 15 and 18. FIG. 3 is a cross-sectional view of upper tanks for the first and second evaporators 15 and 18, FIG. 4 is a schematic longitudinal sectional view of the upper tank of the second evaporator 18, and FIG. 5 is an enlarged sectional view taken along the line V-V of FIG. 4.

First, an example of the integrated structure including the two evaporators 15 and 18 will be explained below with reference to FIG. 2. In the embodiment of FIG. 2, the two evaporators 15 and 18 can be formed integrally into a completely single evaporator structure. Thus, the first evaporator 15 constitutes an upstream side area of the single evaporator structure in the direction of the air flow A, while the second evaporator 18 constitutes a downstream side area of the single evaporator structure in the direction of the air flow A.

The first evaporator 15 and the second evaporator 18 have the same basic structure, and include heat exchange cores 15a and 18a, and tanks 15b, 15c, 18b, and 18c positioned on both upper and lower sides of the heat exchange cores 15a and 18a, respectively.

The heat exchanger cores 15a and 18a respectively include a plurality of tubes 21 extending in a tube longitudinal direction (e.g., vertically in FIG. 2). The tube 21 corresponds to a heat source fluid passage in which a heat source fluid for performing a heat exchange with a heat-exchange medium flows. One or more passages for allowing a heat-exchange medium, namely air to be cooled in the embodiment, to pass therethrough are formed between these tubes 21.

Between these tubes 21, fins 22 are disposed, so that the tubes 21 can be connected to the fins 22. Each of the heat exchange cores 15a and 18a is constructed of a laminated structure of the tubes 21 and the fins 22. These tubes 21 and fins 22 are alternately laminated in a lateral direction of the heat exchange cores 15a and 18a. In other embodiments, any appropriate structure without using the fins 22 in the cores 15a and 18a may be employed.

In FIG. 2, only some of the fins 22 are shown, but in fact the fins 22 are disposed over the whole areas of the heat exchange cores 15a and 18a, and the laminated structure including the tubes 21 and the fins 22 is disposed over the whole areas of the heat exchange cores 15a and 18a. The blown air by the electric blower 19 is adapted to pass through voids (clearances) in the laminated structure.

The tube 21 constitutes the refrigerant passage through which refrigerant flows, and is made of a flat tube having a flat cross-sectional shape in the air flow direction A. The fin 22 is a corrugated fin made by bending a thin plate in a wave-like shape, and is connected to a flat outer surface of the tube 21 to expand a heat transfer area of the air side.

The tubes 21 of the heat exchanger core 15a and the tubes 21 of the heat exchanger core 18a independently constitute the respective refrigerant passages. The tanks 15b and 15c on both upper and lower sides of the first evaporator 15, and the tanks 18b and 18c on both upper and lower sides of the second evaporator 18 independently constitute the respective refrigerant passage spaces.

As shown in FIG. 5, the tanks 15b and 15c on both upper and lower sides of the first evaporator 15 have tube fitting holes 15d into which upper and lower ends of the tube 21 of the heat exchange core 15a are inserted and attached, so that both the upper and lower ends of the tube 21 are communicated with the inside space of the tanks 15b and 15c, respectively.

Similarly, the tanks 18b and 18c on both upper and lower sides of the second evaporator 18 have tube fitting holes 18d into which upper and lower ends of the tube 21 of the heat exchange core 18a are inserted and attached, so that both the upper and lower ends of the tube 21 are communicated with the inside space of the tanks 18b and 18c, respectively.

Thus, the tanks 15b, 15c, 18b, and 18c disposed on both upper and lower sides serve to distribute the refrigerant flows to the respective tubes 21 of the heat exchange cores 15a and 18a, and to collect the refrigerant flows from these tubes 21.

In FIG. 5, only the tube fitting holes on the side of the upper tanks 15b and 18b among the tube fitting holes 15d and 18d of the tanks 15b, 15c, 18b, and 18c on the upper and lower sides are shown. In contrast, since the tube fitting holes on the side of the lower tanks 15c and 18c have the same structure as that of the tube fitting holes on the side of the upper tanks 15b and 18b, representation of the tube fitting holes of the lower tanks 15c and 18c side is omitted.

Since the two upper tanks 15b and 18b are adjacent to each other, the two upper tanks 15b and 18b can be molded integrally. The same can be made for the two lower tanks 15c and 18c. It is apparent that the two upper tanks 15b and 18b may be molded independently as independent components, and that the same can be made for the two lower tanks 15c and 18c.

In the embodiment, as shown in FIGS. 2 and 5, the two upper tanks 15b and 18b are molded by division into a bottom-side half member 60 (first member), an upper-side half member 61 (second member), and a cap 62.

More specifically, the bottom-side half member 60 has a substantially W-shaped section which is obtained by integrally forming respective bottom-side half parts of the two upper tanks 15b and 18b. The upper-side half member 61 has a substantially M-shaped section which is obtained by integrally forming respective upper-side half parts of the two upper tanks 15b and 18b.

In the center area of the substantially W-shaped section of the bottom-side half member 60, a flat surface part 60a is formed. In the center area of the substantially M-shaped section of the upper-side half member 61, a flat surface part 61a is formed. Combining the bottom-side half member 60 with the upper-side half member 61 brings the flat surface part 60a into contact with the flat surface part 61a to form two cylindrical shapes. One ends of the two cylindrical shapes (right end of FIG. 2) in the longitudinal direction are closed with the cap 62, constituting the two upper tanks 15b and 18b.

Material suitable for use in the evaporator components, such as the tube 21, the fin 22, the tanks 15b, 15c, 18b, and 18c, may include, for example, aluminum, which is metal with excellent thermal conductivity and brazing property. By forming each component using the aluminum material, the entire structures of the first and second evaporators 15 and 18 can be assembled integrally with brazing.

In the embodiment, a capillary tube 17a or the like constituting the throttle 17 and a connection block 23 shown in FIG. 2 are assembled integrally to the first and second evaporators 15 and 18 with brazing.

On the other hand, the ejector 14 has the nozzle 14a in which a fine passage is formed with high accuracy. Brazing of the ejector 14 may cause heat deformation of the nozzle part 14a at high temperature in brazing (at brazing temperature of aluminum: about 600° C.). This will disadvantageously result in the fact that the shape and dimension or the like of the passage of the nozzle part 14a cannot be maintained according to a predetermined design.

Thus, the ejector 14 is assembled to the evaporator side after integrally brazing the first and second evaporators 15 and 18, the connection block 23, and the capillary tube 17a, and the like.

More specifically, an assembly structure including the ejector 14, the capillary tube 17a, and the connection block 23 and the like will be explained below. The capillary tube 17a and the connection block 23 are made of the same aluminum material as that of the evaporator components.

Referring to FIG. 5, the capillary tube 17a is disposed to be sandwiched in a valley-like part 61b (recess part between the tanks 15b, 18b) formed on the flat surface part 61a of the upper-side half member 61 of the upper tanks 15b and 18b.

The connection block 23 is a member brazed and fixed to one side (left side in FIG. 2) of each of the upper tanks 15b and 18b in the tank longitudinal direction among the first and second evaporators 15 and 18. The connection block 23 includes a refrigerant inlet 25 of the integrated unit 20 shown in FIG. 1, one refrigerant outlet 26, and an ejector inlet part 63 for assembling the ejector 14 to the evaporator side.

Figure 6:
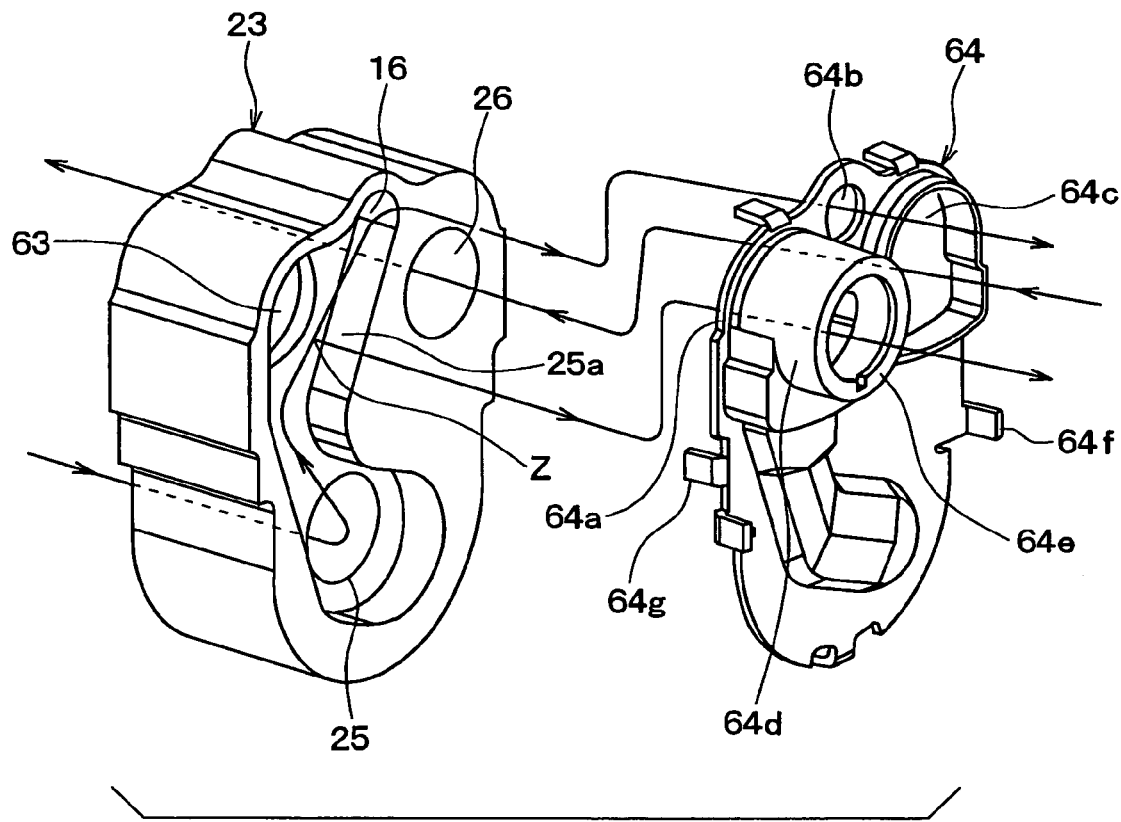
FIG. 6 is a perspective view of a connection block and an intervening plate in the integrated unit of FIG. 2.

As shown in FIGS. 3 and 6, the refrigerant inlet 25 branches, in a midstream of the connection block 23 in the thickness direction, into a main passage 25a serving as a first passage directed to the inlet of the ejector 14, and a branch passage 16 serving as a second passage directed to the inlet of the capillary tube 17a. This part of the branch passage 16 corresponds to an inlet part of the branch passage 16 shown in FIG. 1. Thus, a branch point Z of FIG. 1 is provided inside the connection block 23.

The refrigerant outlet 26 is composed of one simple passage hole (circular hole or the like) penetrating the connection block 23 in the thickness direction as shown in FIGS. 2 and 6.

The connection block 23 is brazed and fixed to the side of the upper tanks 15b and 18b via an intervening plate 64. The intervening plate 64 serves to form the main passage 25a and the branch passage 16 as described above by being integrally fixed with the connection block 23, and to fix the ejector 14 in the longitudinal direction.

In the intervening plate 64 molded of the aluminum material, a main passage side opening 64a in communication with the main passage 25a of the connection block 23, a branch passage side opening 64b in communication with the branch passage 16 of the connection block 23, and a refrigerant outlet side opening 64c in communication with the refrigerant outlet 26 of the connection block 23 are formed.

A cylindrical part 64d is formed at a peripheral part of the main passage side opening 64a to be inserted into the upper tank 18b. An annular flange 64e protruding in the inner diameter direction of the cylindrical part 64d is formed on the tip of the cylindrical part 64d.

A first lug 64f (claw portion) protruding from the intervening plate 64 toward the evaporator side is caulked and fastened to the upper tanks 15b and 18b, so that the intervening plate 64 can be temporarily fixed to the evaporator side. Furthermore, a second lug 64g (claw portion) protruding from the intervening plate 64 toward the connection block 23 is caulked and fastened to the connection block 23, so that the connection block 23 can be temporarily fixed to the evaporator side.

The branch passage side opening 64b of the intervening plate 64 is brazed and seal-connected to the upstream side end (left end shown in FIG. 2) of the capillary tube 17a.

With such an arrangement of the connection block 23 and the intervening plate 64, the refrigerant outlet 26 of the connection block 23 communicates with a left space 31 of the upper tank 15b via the refrigerant outlet side opening 64c of the intervening plate 64, and the main passage 25a of the connection block 23 communicates with a left space 27 of the upper tank 18b via the main passage side opening 64a of the intervening plate 64. Moreover, the connection block 23 and the intervening plate 64 are brazed to the side ends of the upper tanks 15b and 18b, with the branch passage 16 of the connection block 23 communicating with the upstream side end 17c of the capillary tube 17a via the branch passage side opening 64b of the intervening plate 64.

An ejector fixing plate 65 is a member which serves to fix the diffuser 14d of the ejector 14, while partitioning the inside space of the upper tank 18b into the left space 27 and a right space 28, as shown in FIGS. 2-4. The left space 27 of the upper tank 18b acts as a collecting tank for collecting the refrigerants having passed through a plurality of tubes 21 in the second evaporator 18.

The ejector fixing plate 65 is disposed in a substantial center portion of the inside space of the upper tank 18b of the second evaporator 18 in the longitudinal direction, and brazed to the inside wall surface of the upper tank 18b.

Figure 7:
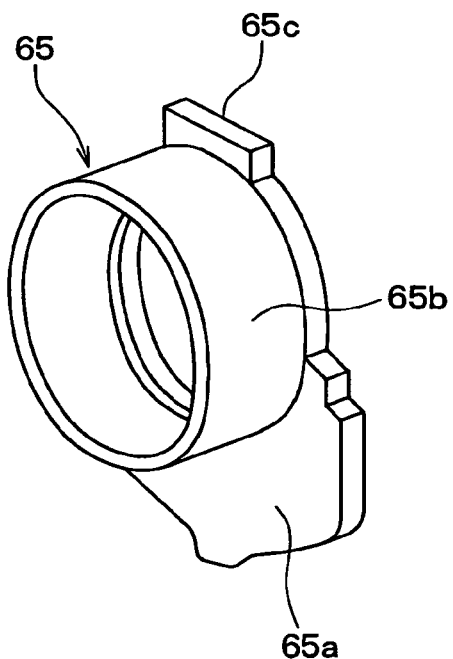
FIG. 7 is a perspective view of an ejector fixing plate in the integrated unit of FIG. 2.

As shown in FIG. 7, the ejector fixing plate 65 is made of aluminum material, and includes a flat plate part 65a partitioning the upper tank 18b in the lateral direction of FIG. 7, a cylindrical part 65b protruding from the flat plate part 65a in the longitudinal direction of the upper tank 18b, and a lug 65c protruding upward from the upper end of the flat plate part 65a.

Inside the cylindrical part 65b, a through hole is formed to penetrate the ejector fixing plate 65 laterally. The lug 65c penetrates a slit-like hole 66 on the upper surface of the upper tank 18b, and is caulked and fastened to the upper tank 18b as shown in FIG. 4. This can temporarily fix the ejector fixing plate 65 to the upper tank 18b.

Referring back to FIG. 4, the downstream side end (right end) 17d of the capillary tube 17a is inserted into the upper tank 18b in the direction of lamination of the tubes 21 (laterally in FIG. 4). More specifically, the downstream side end 17d of the capillary tube 17a is inserted into a through hole 62a of the cap 62 of the upper tank 18b to be opened inside of the right space 28. Sealing connection is formed between the outer peripheral surface of the capillary tube 17a and the through hole 62a of the cap 62 with brazing.

An upper and lower partition plate 67 is disposed in a substantial center area of the right space 28 of the upper tank 18b in the vertical direction. The upper and lower partition plate 67 serves to partition the right space 28 into two spaces in the up-down direction, that is, into an upper space 69 and a lower space 70. The lower space 70 serves as a distribution tank for distributing the refrigerant to the plurality of tubes 21 of the second evaporator 18.

Figure 8:
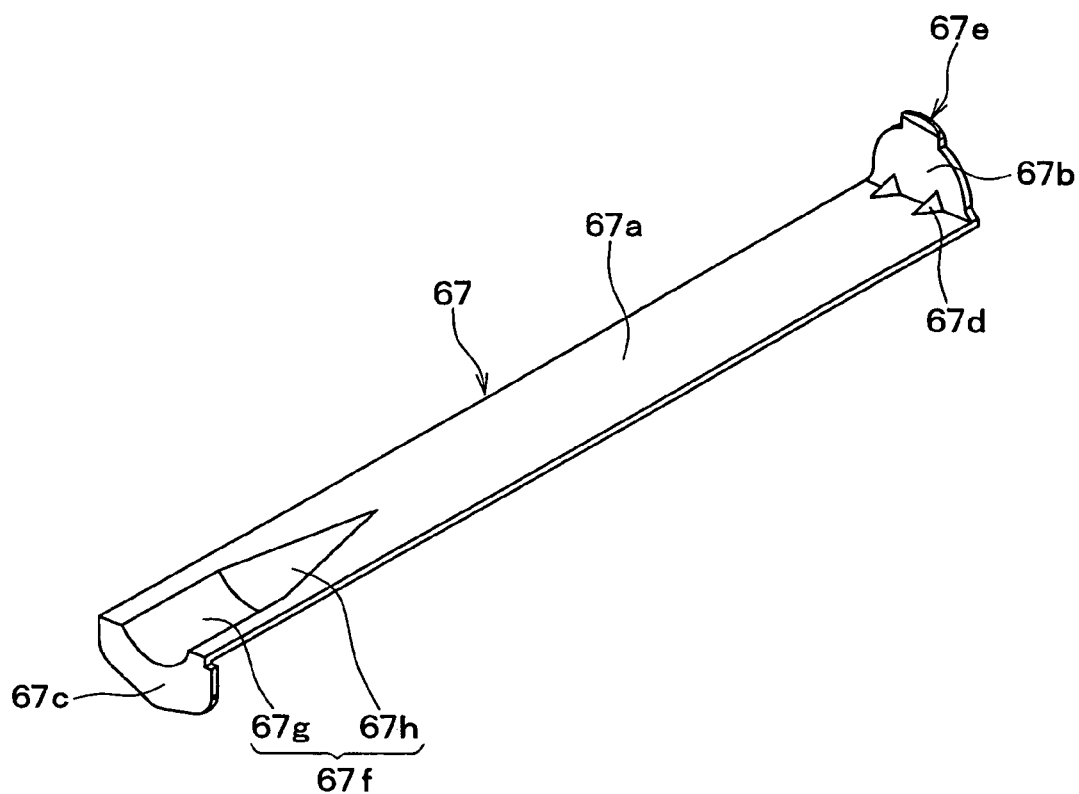
FIG. 8 is a perspective view of an upper and lower partition plate in the integrated unit of FIG. 2.

The upper and lower partition plate 67 is made of an aluminum material, and brazed to the inner wall surface of the upper tank 18b. The partition plate 67 has a plate shape extending in the longitudinal direction of the upper tank 18b as a whole as shown in FIG. 8.

More specifically, the upper and lower partition plate 67 includes a flat plate surface 67a extending in the longitudinal direction of the upper tank 18b, and first and second flexed parts 67b and 67c which are flexed (bent) at right angles in opposite directions to each other at two ends of the flat plate surface 67a in the longitudinal direction. That is, the first flexed plate 67b is a plate bent upwardly from the flat plate surface 67a by approximately right angle, and the second flexed plate 67c is a bent downwardly from the flat plate surface 67a.

The first flexed part 67b is flexed upward from one end of the flat plate surface 67a which is nearer to the downstream side end 17d of the capillary tube 17a (on the right side of FIG. 4), while the second flexed part 67c is flexed downward from the other end of the flat plate surface 67a.

As shown in FIG. 5, the flat plate surface 67a is slanted so as to be lowered from the first evaporator 15 side to the second evaporator 18 side. At the root of the first flexed part 67b, a rib 67d protruding toward the flat plate surface 67a in a triangle shape is integrally formed. The rib 67d enhances the rigidity of the first flexed part 67b, thereby maintaining a flexed angle of the first flexed part 67b at the right angle.

As shown in FIG. 4, a lug 67e protruding upward from the tip (upper end) of the first flexed part 67b penetrates the slit-like hole 68 on the upper surface of the upper tank 18b, and thus is caulked and fastened to the upper tank 18b. Thus, the upper and lower partition plate 67 can be temporarily fixed to the upper tank 18b.

By forming the first flexed part 67b in the upper and lower partition plate 67, the lower space 70 is expanded upward more on the downstream side end 17d of the capillary tube 17a (on the right side of FIG. 4) than at the first flexed part 67b. That is, in the space on the side of the downstream side end 17d of the capillary tube 17a among the right space 28, the upper space 69 is not formed, and the lower space 70 is formed over the entire vertical area of the right space 28.

As shown in FIG. 8, on one end of the second flexed part 67c side of the flat plate surface 67a of the upper and lower partition plate 67 (on the left side in FIG. 8), a recess 67f which is recessed toward the lower space 70 side is formed. The recess 67f includes a cylindrical recess part 67g and a conic recess part 67h.

The cylindrical recess part 67g has a shape extending in the longitudinal direction of the flat plate surface 67a at an end on the second flexed part 67c side of the flat plate surface 67a (on the left side in FIG. 8). The conic recess part 67h is formed successively in connection with the cylindrical recess part 67g near the first flexed part 67b side (on the right side in FIG. 8) rather than the cylindrical recess part 67g. The conic recess part 67h has such a shape that the cylindrical recess part 67g side of the recess part 67h is deep, and that the farther from the cylindrical recess part 67g, the shallower the recess part 67h.

The ejector 14 is made of a metal material such as copper, or aluminum. Alternatively, the ejector 14 may be made of resin (non-metal material). After a step of integrally brazing and assembling the first and second evaporators 15 and 18 or the like (a step of brazing), the ejector 14 is inserted into the upper tank 18b through holes including the ejector inlet 63 of the connection block 23, and the main passage side opening 64a of the intervening plate 64.

The tip part 14e of the ejector 14 in the longitudinal direction shown in FIG. 3 corresponds to the outlet part 14e of the ejector 14 shown in FIG. 1. This ejector tip part 14e is inserted into the cylindrical part 65b of the ejector fixing plate 65 to be sealed and fixed using an O ring 29a.

As shown in FIG. 4, the ejector tip part 14e is disposed in such a position that it crosses the flat plate surface 67a of the upper and lower partition plate 67 in the vertical direction. The recess 67f is formed in the upper and lower partition plate 67, and the outer peripheral surface of the diffuser 14d of the ejector 14 is disposed in and on the cylindrical recess part 67g of the recess 67f. This allows the entire tip part 14e of the ejector to be opened in the upper space 69 of the right space 28 within the upper tank 18b. The refrigerant suction port 14b of the ejector 14 is in communication with the left space 27 of the upper tank 18b of the second evaporator 18.

As shown in FIG. 3, at a substantial center of the inside space of the upper tank 15b of the first evaporator 15 in the tank longitudinal direction, is disposed a left and right partition plate 30, which partitions the inside space of the upper tank 15b into two spaces in the tank longitudinal direction, that is, the left space 31 and a right space 32.

The left space 31 serves as the collecting tank for collecting the refrigerants having passed through the plurality of tubes 21 of the first evaporator 15. The right space 32 serves as the distribution tank for distributing the refrigerant to the plurality of tubes 21 of the first evaporator 15.

As shown in FIGS. 4 and 5, on the flat plate surface 61a of the upper-side half member 61 of the upper tanks 15b and 18b, a recess part 61c is formed at a part positioned in the upper space 69 of the right space 28 within the upper tank 18b.

A plurality of recess parts 61c are arranged in the direction of lamination of the tubes 21 (laterally in FIG. 4). A plurality of communication holes 71 are formed by spaces enclosed by these recess parts 61c and the flat plate surface 60a of the bottom-side half member 60 of the upper tanks 15b and 18b.

The upper space 69 of the right space 28 within the upper tank 18b, and the right space 32 of the upper tank 15b of the first evaporator 15 are communicated with each other via the plurality of communication holes 71.

The plurality of recess parts 61c may be formed in such a shape that they are connected into one body, thereby forming the communication holes 71 across the entire area in the upper space 69 in the lateral direction (in the direction of lamination of the tubes 21).

The left end of the ejector 14 (left end of FIG. 3) in the longitudinal direction corresponds to the inlet part of the nozzle part 14a of FIG. 1. This left end is fitted into and is air-tightly fixed to the inner peripheral surface of the cylindrical part 64d of the intervening plate 64 using an O ring 29b.

In the embodiment, the ejector 14 is fixed in the longitudinal direction as follows. First, after inserting the ejector 14 from the ejector inlet part 63 of the connection block 23 into the upper tank 18b, the spacer 72 is inserted into the ejector inlet part 63, and then external threads on the outer peripheral surface of a columnar plug 73 mesh with internal threads on the inner peripheral surface of the ejector inlet part 63. In the embodiment, the spacer 72 and the plug 73 are made of aluminum material, respectively.

Figure 9:
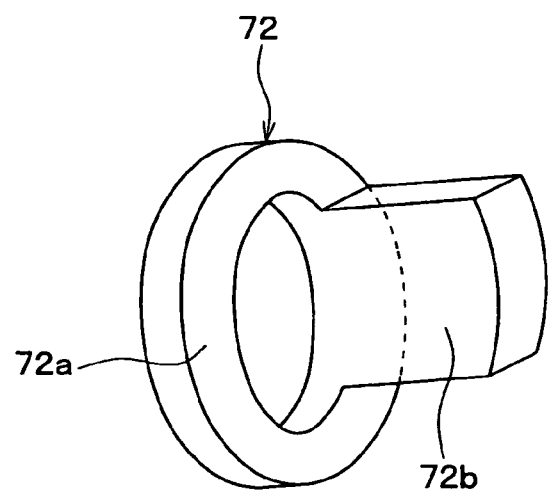
FIG. 9 is a perspective view of a spacer in the integrated unit of FIG. 2.

As shown in FIG. 9, the spacer 72 includes an annular part 72a, and a protruding part 72b protruding from a part of the annular part 72a in an axial direction. Thus, when the plug 73 meshes with the ejector inlet part 63, the protruding part 72b of the spacer 72 presses the left end of the ejector 14 in the direction of insertion of the ejector 14.

On the other hand, on the left end of the ejector 14, an annular part 74 whose diameter is larger than the ejector itself is formed. Thus, when the protruding part 72b of the spacer 72 is pressed against the left end of the ejector 14 in the insertion direction of the ejector 14, the annular part 74 of the ejector 14 is pressed against the flange 64e of the intervening plate 64. This can fix the ejector 14 in the longitudinal direction of the ejector 14.

If the protruding part 72b is formed to protrude from the entire circumference of the annular part 72a of the spacer 72 so as to make the spacer 72 in a simple cylindrical shape, the main passage 25a of the connection block 23 would be closed by the spacer 72.

In contrast, since in the embodiment, the protruding part 72b of the spacer 72 is formed to protrude from only one part of the annular part 72a of the spacer 72, the ejector 14 can be fixed in the longitudinal direction without closing the main passage 25a of the connection block 23.

The outer peripheral surface of the cylindrical plug 73 is fitted into and seal-fixed to the inner peripheral surface of the ejector inlet part 63 of the connection block 23 using the O ring 29c.

As shown in FIGS. 4 and 5, a refrigerant retention plate 75 (refrigerant staying plate) is disposed in the lower space 70 of the right space 28 within the upper tank 18b. The refrigerant retention plate 75 is a member which serves to uniform the distribution of the refrigerant to the plurality of tubes 21 of the second evaporator 18. The refrigerant retention plate 75 of the embodiment is made of aluminum material, and has a plate-like shape with a mountain-like section, extending in the direction of lamination of the tubes 21 (laterally in FIG. 4). The mountain-like section protrudes from a horizontal surface in the refrigerant retention plate 75.

Figure 10:
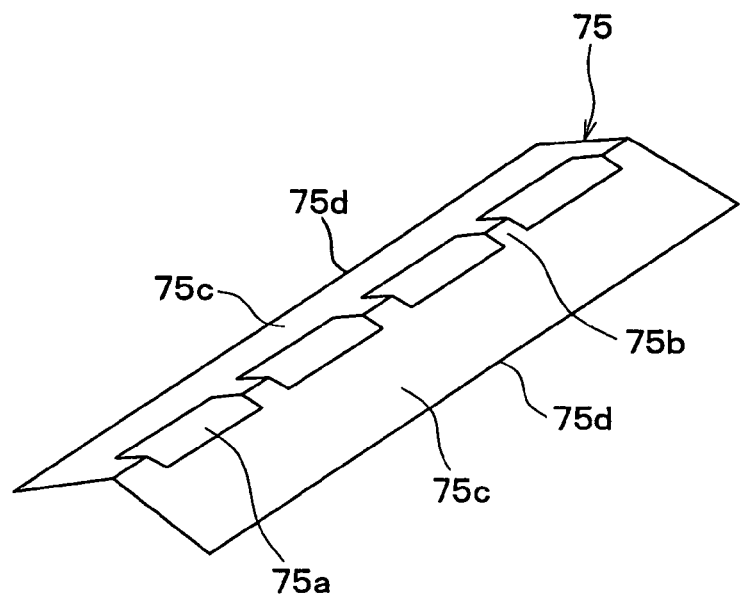
FIG. 10 is a perspective view of a refrigerant retention plate in the integrated unit of FIG. 2.

Referring to FIG. 10, a plurality of holes 75a, each of which has approximately a rectangular open shape, are formed on the top part of the refrigerant retention plate 75 having the mountain-like section, in the direction of lamination of the tubes 21. Between these rectangular holes 75a, a connection part 75b having a mountain-like section is formed. The connection part 75b can ensure the rigidity of the refrigerant retention plate 75 even when the holes 75a are formed in the refrigerant retention plate 75.

As shown in FIG. 5, an end 75d on the side of a bottom part 75c with a mountain-like section of the refrigerant retention plate 75 is placed on the upper end surface of the tube 21, and brazed to the inner wall surface 60b extending in the vertical direction of the bottom-side half member 60 of the upper tank 18b. This creates a valley-like retention portion 76 between the bottom part 75c of the refrigerant retention plate 75 and the inner wall surface of the upper tank 18b.

In this embodiment, the ejector fixing plate 65 partitions an inner portion of the upper tank 18b of the second evaporator 18 into the left and right spaces 27, 28, such that the left space 27 is used as a collecting tank for collecting refrigerant from the plurality of tubes 21, and the right space 28 is used as a distributing tank for distributing refrigerant into the plurality of tubes 21. The ejector 14 extends longitudinally in an axial direction of the nozzle part 14a in a thin shape, and is located in parallel with the upper tank 18b such that the longitudinal direction of the ejector 14 corresponds to the longitudinal direction of the upper tank 18b.

Accordingly, the arrangement of the ejector 14 and the second evaporator 18 can be made compact, so as to reduce the whole unit size. Furthermore, because the ejector 14 is disposed in the left space 27 used as the collecting tank, the refrigerant suction port 14b of the ejector 14 can be directly opened in the left space 27 without using a pipe member.

Thus, it is possible to reduce the number of the refrigerant pipes and simplify the piping structure. Furthermore, it is possible to perform the refrigerant collection (refrigerant joining) from the plurality of tubes 21 and the refrigerant supply to the refrigerant suction port 14b of the ejector 14, by using a single tank (27).

In this embodiment, the first evaporator 15 and the second evaporator 18 are arranged adjacent to each other in the air flow direction, and the downstream side end portion of the ejector 14 is located adjacent to the distribution tank (i.e., the right space 32 of the upper tank 15b). In this structure, even when the ejector 14 is located in the second evaporator 18, a refrigerant supply path from the outlet 14e of the ejector 14 to the first evaporator 15 can be formed simply.

Figure 11:
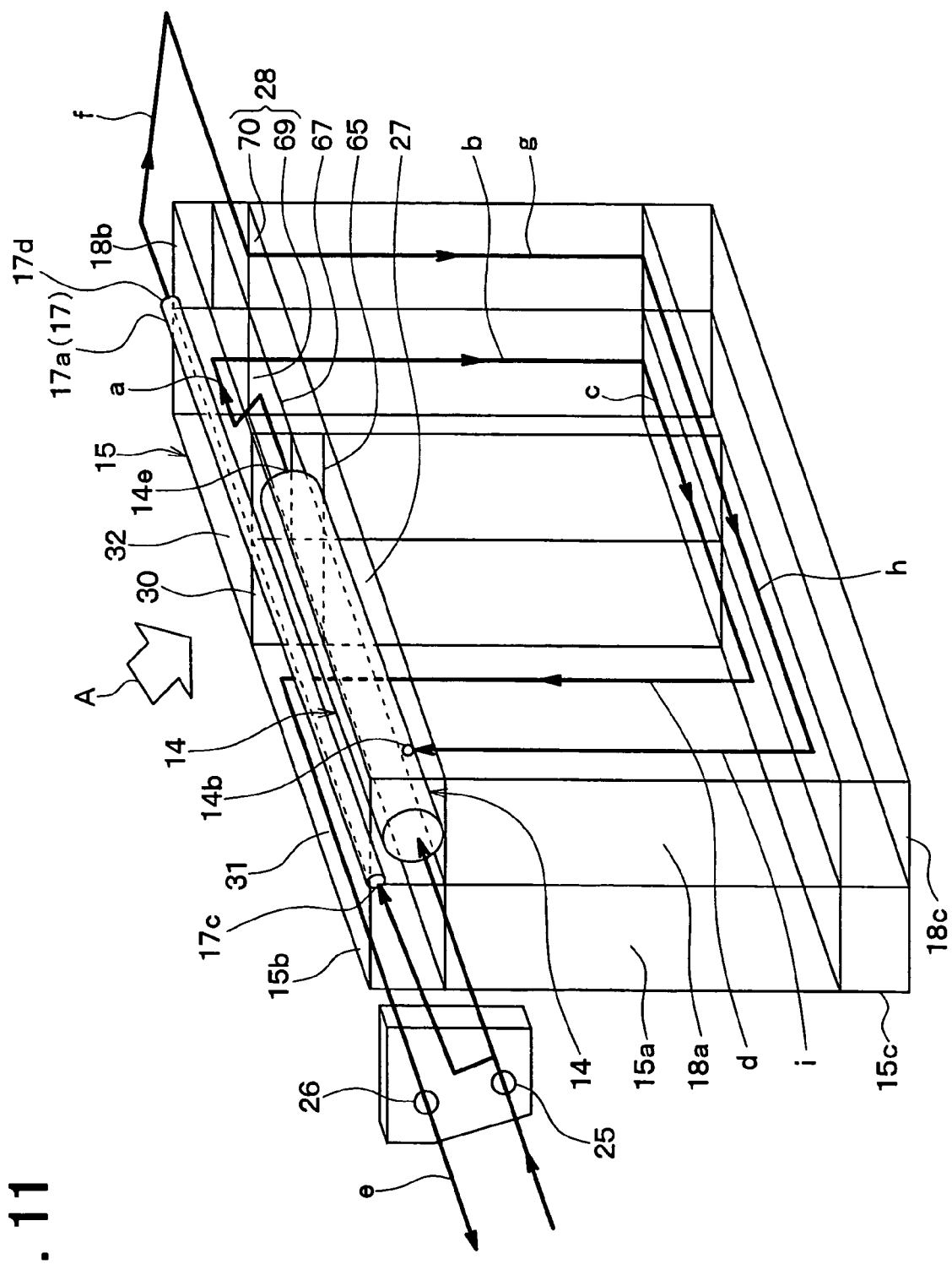
FIG. 11 is a schematic perspective view showing an entire refrigerant flow path in the integrated unit of FIG. 2.

In the above-mentioned structure, refrigerant flow paths of the entire integrated unit 20 will be described below in more detail with reference to FIGS. 3, 4, and 11. FIG. 11 is a schematic perspective view showing the whole refrigerant flow paths in the integrated unit 20.

The refrigerant inlet 25 of the connection block 23 is branched into the main passage 25a and the branch passage 16. The refrigerant in the main passage 25a passes through the main passage side opening 64a of the intervening plate 64, and then is decompressed through the ejector 14 (the nozzle part 14a →the mixer 14c →the diffuser 14d). The low-pressure refrigerant decompressed flows into the right space 32 of the upper tank 15b of the first evaporator 15 via the upper space 69 of the right space 28 in the upper tank 18b, and via a plurality of communication holes 71 in the direction of the arrow "a".

The refrigerant in the right space 32 moves downward in the tubes 21 positioned on the right side of the heat exchange core 15a in the direction of the arrow "b" to flow into the right side part of the lower tank 15c. Within the lower tank 15c, a partition plate is not provided, and thus the refrigerant moves from the right side of the lower tank 15c to the left side thereof in the direction of the arrow "c".

The refrigerant on the left side of the lower tank 15c moves upward in the tubes 21 positioned on the left side of the heat exchange core 15a in the direction of the arrow "d" to flow into the left space 31 of the upper tank 15b. The refrigerant further flows to the refrigerant outlet 26 of the connection block 23 in the direction of the arrow "e".

In contrast, the refrigerant on the branch passage 16 of the connection block 23 is first decompressed through the capillary tube 17a, and then the low-pressure refrigerant decompressed (liquid-vapor two-phase refrigerant) flows into the lower space 70 of the right space 28 of the upper tank 18b of the second evaporator 18 in the direction of the arrow "f".

The refrigerant flowing into the lower space 70 moves downward in the tubes 21 positioned on the right side of the heat exchange core 18a in the direction of the arrow "g" to flow into the right side part of the lower tank 18c. Within the lower tank 18c, a right and left partition plate is not provided, and thus the refrigerant moves from the right side of the lower tank 18c to the left side thereof in the direction of an arrow "h".

The refrigerant on the left side of the lower tank 18c moves upward in the tubes 21 positioned on the left side of the heat exchange core 18a in the direction of the arrow "i" to flow into the left space 27 of the upper tank 18b. Since the refrigerant suction port 14b of the ejector 14 is in communication with the left space 27, the refrigerant in the left space 27 is sucked from the refrigerant suction port 14b into the ejector 14.

The integrated unit 20 has the structure of the refrigerant passage as described above. Only the single refrigerant inlet 25 may be provided on the connection block 23, and only the single refrigerant outlet 26 may be provided on the connection block 23 in the integrated unit 20 as a whole.

Now, an operation of the first embodiment will be described. When the compressor 11 is driven by a vehicle engine, the high-temperature and high-pressure refrigerant compressed by and discharged from the compressor 11 flows into the radiator 12, where the high-temperature refrigerant is cooled and condensed by the outside air. The high-pressure refrigerant flowing from the radiator 12 flows into the liquid receiver 12a, within which the refrigerant is separated into liquid and vapor phases. The liquid refrigerant is derived from the liquid receiver 12a and passes through the expansion valve 13.

The expansion valve 13 adjusts the degree of opening of the valve (refrigerant flow rate) such that the superheat degree of the refrigerant at the outlet of the first evaporator 15 (i.e., sucked refrigerant by the compressor) becomes a predetermined value, and the high-pressure refrigerant is decompressed. The refrigerant having passed through the expansion valve 13 (middle pressure refrigerant) flows into one refrigerant inlet 25 provided in the connection block 23 of the integrated unit 20.

At that time, the refrigerant flow is divided into the refrigerant flow directed from the main passage 25a of the connection block 23 to the nozzle part 14a the ejector 14, and the refrigerant flow directed from the refrigerant branch passage 16 of the connection block 23 to the capillary tube 17a.

The refrigerant flow into the ejector 14 is decompressed and expanded by the nozzle part 14a. Thus, the pressure energy of the refrigerant is converted into the speed energy at the nozzle part 14a, and the refrigerant is ejected from the jet port of the nozzle part 14a at high speed. At this time, the pressure drop of the refrigerant sucks from the refrigerant suction port 14b, the refrigerant (vapor-phase refrigerant) having passed through the second evaporator 18 on the branch refrigerant passage 16.

The refrigerant ejected from the nozzle part 14a and the refrigerant sucked into the refrigerant suction port 14b are combined by the mixer 14c on the downstream side of the nozzle part 14a to flow into the diffuser 14d. In the diffuser 14d, the speed (expansion) energy of the refrigerant is converted into the pressure energy by enlarging the path area, resulting in increased pressure of the refrigerant.

Figure 12:
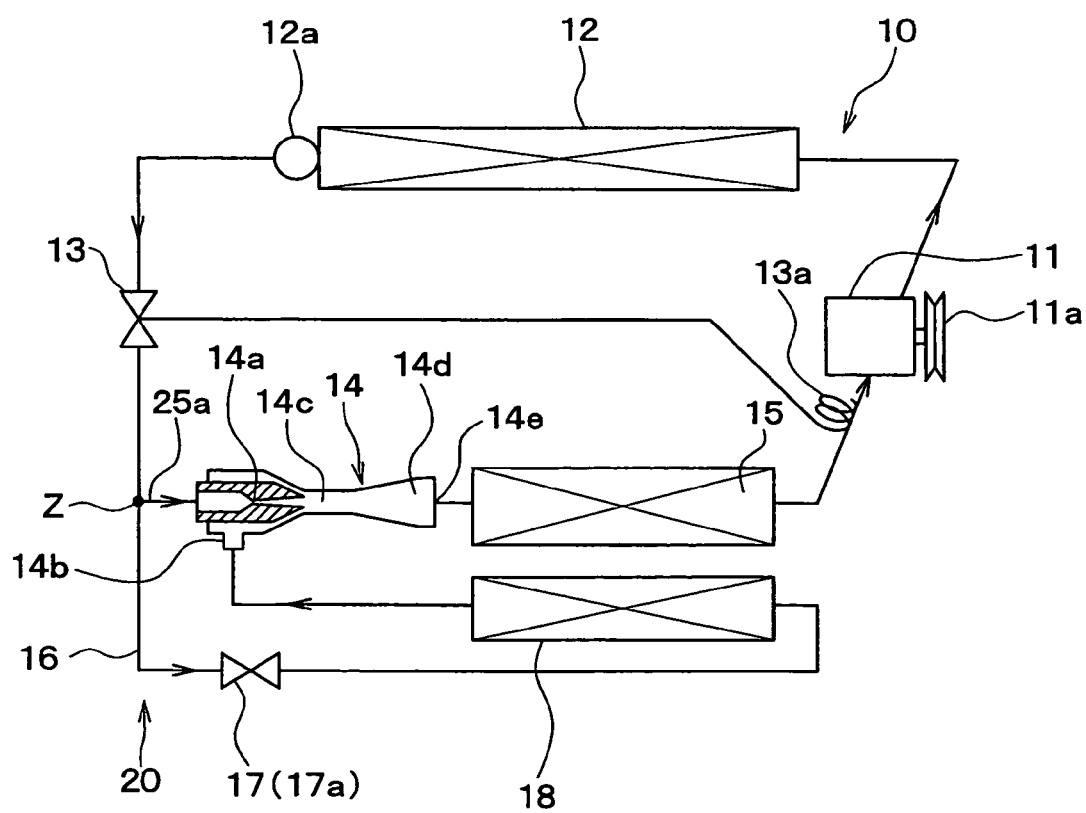
FIG. 12 is a refrigerant circuit diagram of an ejector refrigerant cycle device for a vehicle according to a comparison example.

The refrigerant flowing from the diffuser 14d of the ejector 14 flows through the refrigerant flow paths indicated by the arrows "a" to "e" in FIG. 12 in the first evaporator 15. During this time, in the heat exchange core 15a of the first evaporator 15, the low-temperature and low-pressure refrigerant absorbs heat from the blown air in the direction of an arrow "A" so as to be evaporated. The vapor-phase refrigerant evaporated is sucked from the single refrigerant outlet 26 into the compressor 11, and compressed again.

The refrigerant flow into the refrigerant branch passage 16 is decompressed by the capillary tube 17a to become a low-pressure refrigerant (liquid-vapor two-phase refrigerant). The low-pressure refrigerant flows through the refrigerant flow paths indicated by the arrows "f" to "i" of FIG. 11 in the second evaporator 18. During this time, in the heat exchange core 18a of the second evaporator 18, the low-temperature and low-pressure refrigerant absorbs heat from the blown air having passed through the first evaporator 15 to be evaporated. The vapor-phase refrigerant evaporated is sucked from the refrigerant suction port 14b into the ejector 14.

As mentioned above, according to the embodiment, the refrigerant on the downstream side of the diffuser 14d of the ejector 14 can be supplied to the first evaporator 15, and the refrigerant on the branch path 16 side can be supplied to the second evaporator 18 via a capillary tube (throttle) 17a, so that the first and second evaporators 15 and 18 can exhibit cooling effects at the same time. Thus, the cooled air by both the first and second evaporators 15 and 18 can be blown into a space to be cooled, thereby cooling the space to be cooled.

At that time, the refrigerant evaporation pressure of the first evaporator 15 is the pressure of the refrigerant which has been increased by the diffuser 14d. In contrast, since the outlet side of the second evaporator 18 is connected to the refrigerant suction port 14b of the ejector 14, the lowest pressure of the refrigerant which has been decompressed at the nozzle part 14a can act on the second evaporator 18.

Thus, the refrigerant evaporation pressure (refrigerant evaporation temperature) of the second evaporator 18 can be lower than the refrigerant evaporation pressure (refrigerant evaporation temperature) of the first evaporator 15. With respect to the direction of the flow A of the blown air, the first evaporator 15 whose refrigerant evaporation temperature is high is disposed on the upstream side, and the second evaporator 18 whose refrigerant evaporation temperature is low is disposed on the downstream side. Both a difference between the refrigerant evaporation temperature of the first evaporator 15 and the temperature of the blown air, and a difference between the refrigerant evaporation temperature of the second evaporator 18 and the temperature of the blown air can be secured.

Thus, both cooling performances of the first and second evaporators 15 and 18 can be exhibited effectively. Thus, the cooling performance of the common space to be cooled can be improved effectively in the combination of the first and second evaporators 15 and 18. Furthermore, the effect of pressurization by the diffuser 14d increases the pressure of suction refrigerant of the compressor 11, thereby decreasing the driving power of the compressor 11.

The refrigerant flow rate on the second evaporator 18 side can be adjusted independently by the capillary tube (throttle) 17 without depending on the function of the ejector 14, and the refrigerant flow rate into the first evaporator 15 can be adjusted by a throttle characteristic of the ejector 14. Thus, the refrigerant flow rates into the first and second evaporators 15 and 18 can be adjusted readily, corresponding to the respective heat loads of the first and second evaporators 15 and 18.

For a small cycle heat load, the difference between high and low pressures in the cycle becomes small, and the input of the ejector 14 also becomes small. In the conventional cycle described in JP patent No. 3265649, the refrigerant flow rate passing through the second evaporator 18 depends on only the refrigerant suction ability of the ejector 14. This results in decreased input of the ejector 14, deterioration in the refrigerant suction ability of the ejector 14, and decrease in the refrigerant flow rate of the second evaporator 18 in order, making it difficult to secure the cooling performance of the second evaporator 18.

In contrast, in the embodiment, the refrigerant having passed through the expansion valve 13 is branched at the upstream part of the nozzle part 14a of the ejector 14, and the branched refrigerant is sucked into the refrigerant suction port 14b through the refrigerant branch passage 16, so that the refrigerant branch passage 16 is in a parallel connection relation to the ejector 14.

Thus, the refrigerant can be supplied to the refrigerant branch passage 16, using not only the refrigerant suction ability of the ejector 14, but also the refrigerant suction and discharge abilities of the compressor 11. This can reduce the degree of decrease in the refrigerant flow rate on the second evaporator side 18 as compared with in the conventional cycle, even in the occurrence of phenomena, including decrease in input of the ejector 14, and deterioration in the refrigerant suction ability of the ejector 14. Accordingly, even under the condition of the low heat load, the cooling performance of the second evaporator 18 can be secured readily.

FIG. 12 shows a comparison example of the first embodiment, in which the ejector 14, the first evaporator 15, the second evaporator 18 and the throttle 17 (capillary tube 17a as the fixed throttle) are respectively separately formed and are independently fixed to a vehicle body using piping. In this case, connection pipes connected to the inlet side and the outlet side of the ejector 14, connection pipes connected to the inlet side and the outlet side of the throttle 17, a connection pipe for connecting the outlet side of the second evaporator 18 and the refrigerant suction port 14b, etc. are required additionally, as compared with the integrated unit 20 of the first embodiment. As a result, piping structure of the ejector refrigerant cycle device becomes complex, and mounting performance of the ejector refrigerant cycle device 10 is deteriorated.

In contrast, according to the first embodiment, the ejector 14, the first and second evaporators 15, 18 and the capillary tube 17a are assembled as a single unit structure, that is, the integrated unit 20, and the integrated unit 20 is provided with the single refrigerant inlet 25 and the refrigerant outlet 26. As a result, when the ejector refrigerant cycle device 10 is mounted in the vehicle, the integrated unit 20 provided with the various components (14, 15, 18, 17a) is connected as the whole such that the single refrigerant inlet 25 is connected to the refrigerant outlet side of the expansion valve 13 and the single refrigerant outlet 26 is connected to the refrigerant suction side of the compressor 11.

Furthermore, because the ejector 14 and the capillary tube 17a are located within the tank part (evaporator tank part) of the first and second evaporators 15, 18, the size of the integrated unit 20 can be made smaller and simple, thereby improving the mounting space of the integrated unit 20. As a result, in the first embodiment, the mounting performance of the ejector refrigerant cycle device in the vehicle can be improved, and the connection passage length for connecting the ejector 14, the capillary tube 17a and the first and second evaporators 15, 18 can be effectively reduced, as compared with the comparison example of FIG. 12. Because the connection passage length for connecting the ejector 14, the capillary tube 17a and the first and second evaporators 15, 18 is made minimum in the integrated unit 20, pressure loss in the refrigerant passage can be reduced, and heat exchanging amount of the low-pressure refrigerant in the integrated unit 20 with its atmosphere can be reduced. Accordingly, the cooling performance of the first and second evaporators 15, 18 can be effectively improved.

Because the refrigerant outlet side of the second evaporator 18 is connected to the refrigerant suction port 14b of the ejector 14 without using a pipe, the evaporation pressure of the second evaporator 18 can be made lower by a pressure due to the pipe-caused pressure loss, thereby the cooling performance of the second evaporator 18 can be improved without increasing the compressor-consumed power.

Furthermore, because the ejector 14 is located in the evaporator tank part having a low-temperature condition, it is unnecessary to attach a heat insulating member to the ejector 14.

In the first embodiment, the plural communication holes 71 are arranged in the upper space 69 of the right space 28 within the upper tank 18b in the laminating direction (arrangement direction) of the tubes 21, that is, in the open direction of the ejector tip part 14e. Therefore, the refrigerant discharged from the ejector tip part 14e to the upper space 69 can be effectively uniformly distributed to the communication holes 71 as shown by the arrow "a", and can flow into the right space 32 (distribution tank) of the upper tank 15b of the first evaporator 15. Accordingly, refrigerant discharged from the ejector 14 can smoothly flow into the right space 32 of the upper tank 15b of the first evaporator 15 from the upper space 69 of the upper tank 18b of the second evaporator 18 through the communication holes 71, thereby reducing the pressure loss in the refrigerant paths.

Furthermore, the refrigerant having passed through the plural communication holes 71 flows while being distributed within the right space 32 (distribution tank) of the first evaporator 15 in the laminating direction of the tubes 21, and flows into the tubes 21 of the first evaporator 15. Therefore, refrigerant distribution through the communication holes 71 to the tubes 21 of the first evaporator 15 can be made uniform.

As shown in FIG. 5, the flat plate surface 67a of the upper and lower partition plate 67 is tilted to be lower from the first evaporator 15 side toward the second evaporator 18 side. Therefore, the refrigerant discharged from the ejector tip part 14e into the upper space 69 in the right space 28 of the upper tank 18b of the second evaporator 18 can be smoothly guided toward the communication hole 71 along the flat plat surface 67a of the upper and lower partition plate 67.

According to the first embodiment, as shown in FIG. 4, the recess 67f is formed in the upper and lower partition plate 67 at a vicinity of the ejector tip part 14e to be recessed toward the lower space 70 from the flat plate surface 67a of the upper and lower partition plate 67. In addition, at least a part of the outer peripheral surface of the diffuser 14d of the ejector 14 is disposed on the cylindrical recess part 67g of the recess 67f. This allows the entire tip part 14e of the ejector 14 to be opened in the upper space 69 of the right space 28 within the upper tank 18b while effectively using the space of the upper tank 18b. Accordingly, the entire ejector tip part 14e can be opened into the upper space 69 within the upper tank 18b of the second evaporator 18 without increasing the size of the upper tank 18b.

Furthermore, the conic recess part 67h has such a shape that a side of the cylindrical recess part 67g of the recess part 67h is deep, and that the farther from the cylindrical recess part 67g, the shallower the recess part 67h. Therefore, the refrigerant discharged from the ejector tip part 14e can smoothly flow in the upper space 69 without receiving a resistance at the recess 67f, thereby reducing the pressure loss of refrigerant in the recess 67f.

In addition, according to this embodiment, the rib 67d protruding toward the flat plate surface 67a in a triangle shape is integrally formed at the root of the first flexed part 67b. The rib 67d enhances the rigidity of the first flexed part 67b at the root of the first flexed part 67b thereby maintaining the flexed angle of the first flexed part 67b at the right angle. Thus, after the upper and lower partition plate 67 is temporally fixed, the flexed angle (bending angle) of the first flexed part 67b with the flat plate surface 67a is prevented from being changed before a brazing. As a result, it can prevent a clearance from being caused between the first flexed part 67b and the inner wall surface of the upper tank 18b, thereby the right space 28 in the upper tank 18b can be accurately air-tightly partitioned into the upper space 69 and the lower space 70 by the upper and lower partition plate 67.

In the first embodiment, as shown in FIG. 4, by forming the first flexed part 67b in the upper and lower partition plate 67, the lower space 70 is expanded upward more that the downstream side end 17d of the capillary tube 17a (on the right side of FIG. 4) at the first flexed part 67b. That is, in the space on the side of the downstream side end 17d of the capillary tube 17a among the right space 28, the upper space 69 is not formed, and the lower space 70 is formed over the entire vertical area of the right space 28. Therefore, the lower space 70 extends to an extending line of the upper space 69. Accordingly, the lower space 70 can be provided with a space at which the downstream side end 17d of the capillary tube 17a is directly open. Because the downstream side end 17d of the capillary tube 17a is opened by effectively using the space within the upper tank 18b, the size of the upper tank 18b can be effectively reduced. Here, the downstream side end 17d of the capillary tube 17a is used as an inlet of the lower space 70.

In the ejector refrigerant cycle device 10 of this embodiment, the vapor-liquid two-phase refrigerant (middle-pressure refrigerant) having passed through the expansion valve 13 is divided into the refrigerant flow directed from the main passage 25a of the connection block 23 to the nozzle part 14a of the ejector 14, and the refrigerant flow directed from the refrigerant branch passage 16 of the connection block 23 to the capillary tube 17a.

Since the flow rate of the refrigerant (as indicated by the arrow "f") flowing from the capillary tube 17a into the lower space 70 of the right space 28 of the upper tank 18b in the second evaporator 18 becomes small, the refrigerant may not reach readily the side away from the downstream side end 17d of the capillary tube 17a within the lower space 70 (the distribution tank). As a result, distribution of the refrigerant to the plurality of tubes 21 in the lower space 70 (distribution tank) may become non-uniform, leading to the non-uniform temperature distribution of the cooled air by the second evaporator 18.

However, in the embodiment, as indicated by the arrow "j" of FIG. 5, the liquid refrigerant among the liquid-vapor two-phase refrigerant flowing from the capillary tube 17a into the lower space 70 is temporarily stored in the valley-like retention portion 76 formed on the bottom part 75c of the refrigerant retention plate 75. Then, a part of liquid refrigerant overflowing from the valley-like retention portion 76 falls from the holes 75a of the refrigerant retention plate 75 into the tubes 21. Accordingly, in this embodiment, liquid refrigerant can be uniformly distributed into the plurality of tubes 21 of the second evaporator 18, inserted into the lower space 70. Thus, the temperature distribution of air cooled in the second evaporator 18 can be made uniform.

Figure 13:
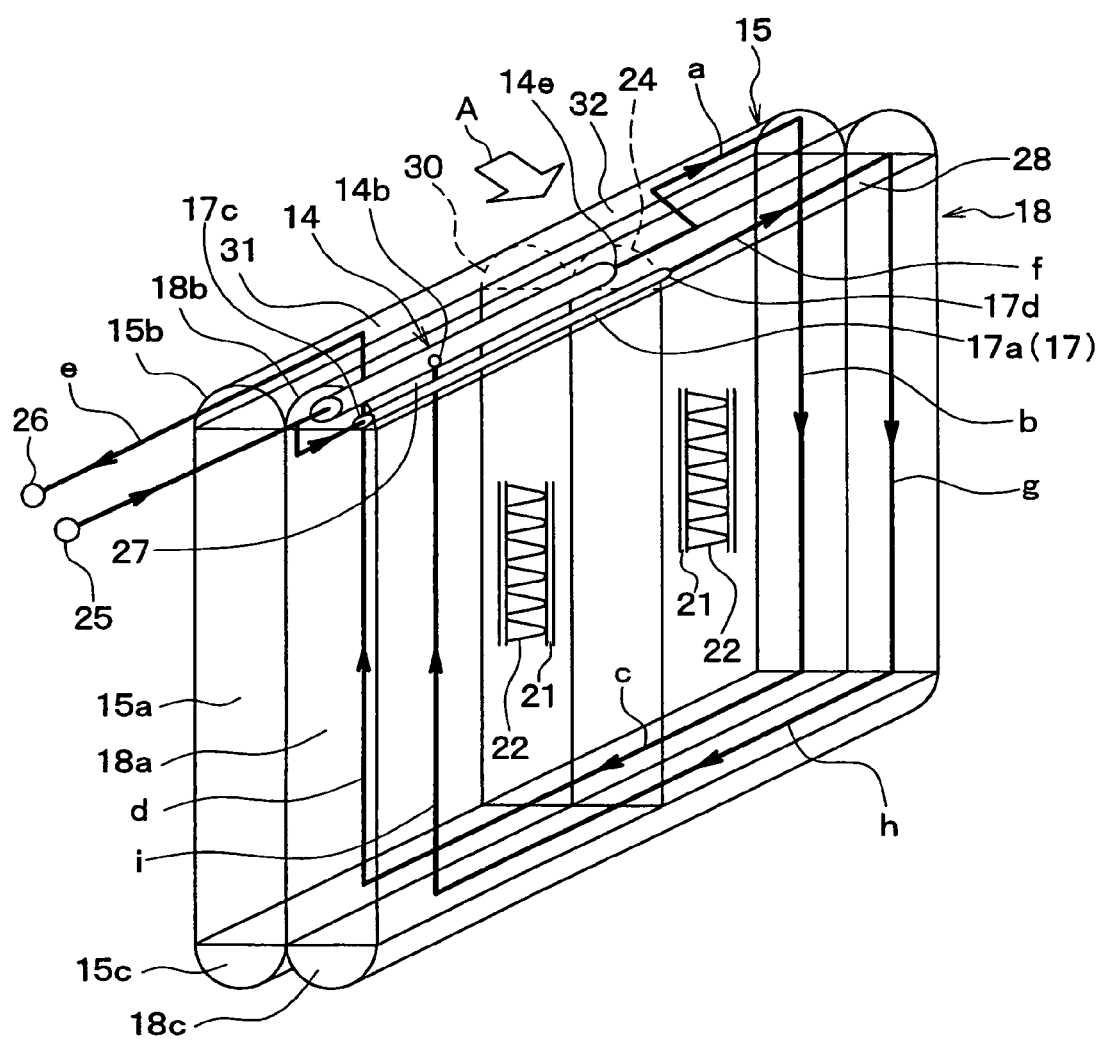
FIG. 13 is a perspective view showing a schematic structure of an integrated unit in an example 1 of the first embodiment.
Figure 14:
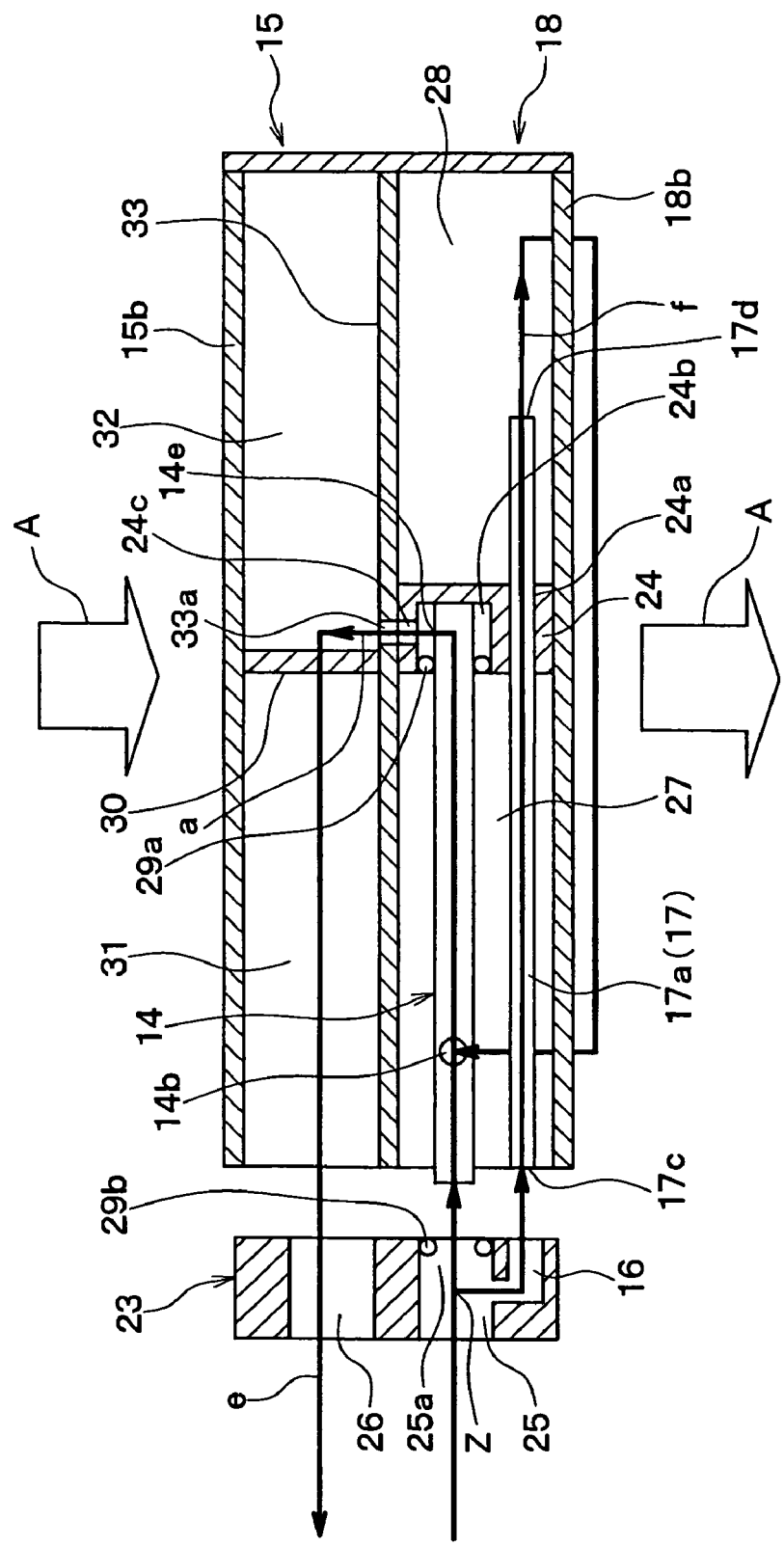
FIG. 14 is a schematic cross-sectional view of an evaporator tank of the integrated unit of FIG. 13.
Figure 15:
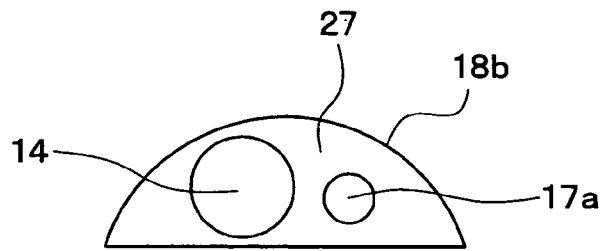
FIG. 15 is a side view of the evaporator tank of FIG. 14.

FIGS. 13 to 15 show an example 1 that is a modified integrated unit 20 of the present embodiment. That is, the example 1 is a modified example of the above-described first embodiment. FIG. 13 is a schematic perspective view showing the entire structure of the integrated unit 20 in the example 1, FIG. 14 is a schematic cross-sectional view of an upper tank of the first and second evaporators 15 and 18 in the example 1, and FIG. 15 is a sectional view of the upper tank of the second evaporator 18 in the example 1.

In the example 1, the capillary tube 17a is disposed within the upper tank 18b. That is, the downstream side end 17d of the capillary tube 17a is opened within the right space 28 of the upper tank 18b, penetrating a support hole 24a of a second connection block 24, as shown in FIG. 14. In the example 1, the refrigerant retention plate 75 is not disposed in the right space 28.

The connection block 23 in the example 1 of FIG. 14 corresponds to an integrated body of the connection block 23 and the intervening plate 64 according to the above-described embodiment. In the example 1, the ejector inlet part 63 is not formed, and the ejector 14 is inserted from the refrigerant inlet 25 into the upper tank 18b of the second evaporator 18. Thus, in this example, the spacer 72 and the plug 73 of the embodiment are not necessary.

Instead of the ejector fixing plate 65 of the embodiment, the second connection block 24 is disposed in the center area of the upper tank 18b in the tank longitudinal direction. This second connection block 24 partitions the inside space of the upper tank 18b into left and right spaces.

Since the upper and lower partition plate 67 of the above-described embodiment is not provided in this example 1, the right space 28 inside the upper tank 18b of the second evaporator 18 serves as one space without being partitioned into the upper space 69 and the lower space 70.

Instead of the communication hole 71 of the embodiment, a communication hole 24c of the second connection block 24 is communicated with the right space 32 of the upper tank 15b of the first evaporator 15 via a through hole 33a of an intermediate wall 33 between both the upper tanks 15b and 18b.

Thus, the low-pressure refrigerant discharged from the diffuser 14d of the ejector 14 flows into the right space 32 of the upper tank 15b of the first evaporator 15 via the communication hole 24c of the second connection block 24 and the through hole 33a of the intermediate wall 33 in the direction of the arrow "a" in FIG. 14.

In this example 1, the ejector fixing plate 65 and the upper and lower partition plate 67 can be used instead of the second connection block 24 such that the right space 28 of the upper tank 18b is partitioned into the upper space 69 and the lower space 70.

Furthermore, the plural communication holes 71 are arranged such that the upper space 69 of the upper tank 18b of the second evaporator 18 and the right space 32 of the upper tank 15b of the first evaporator 15 communicate with each other. Accordingly, even in the example 1, the low-pressure refrigerant discharged from the ejector tip end 14e can smoothly flow into the right space 32 of the first evaporator 15 through the communication holes 71, thereby reducing the pressure loss.

Figure 16:
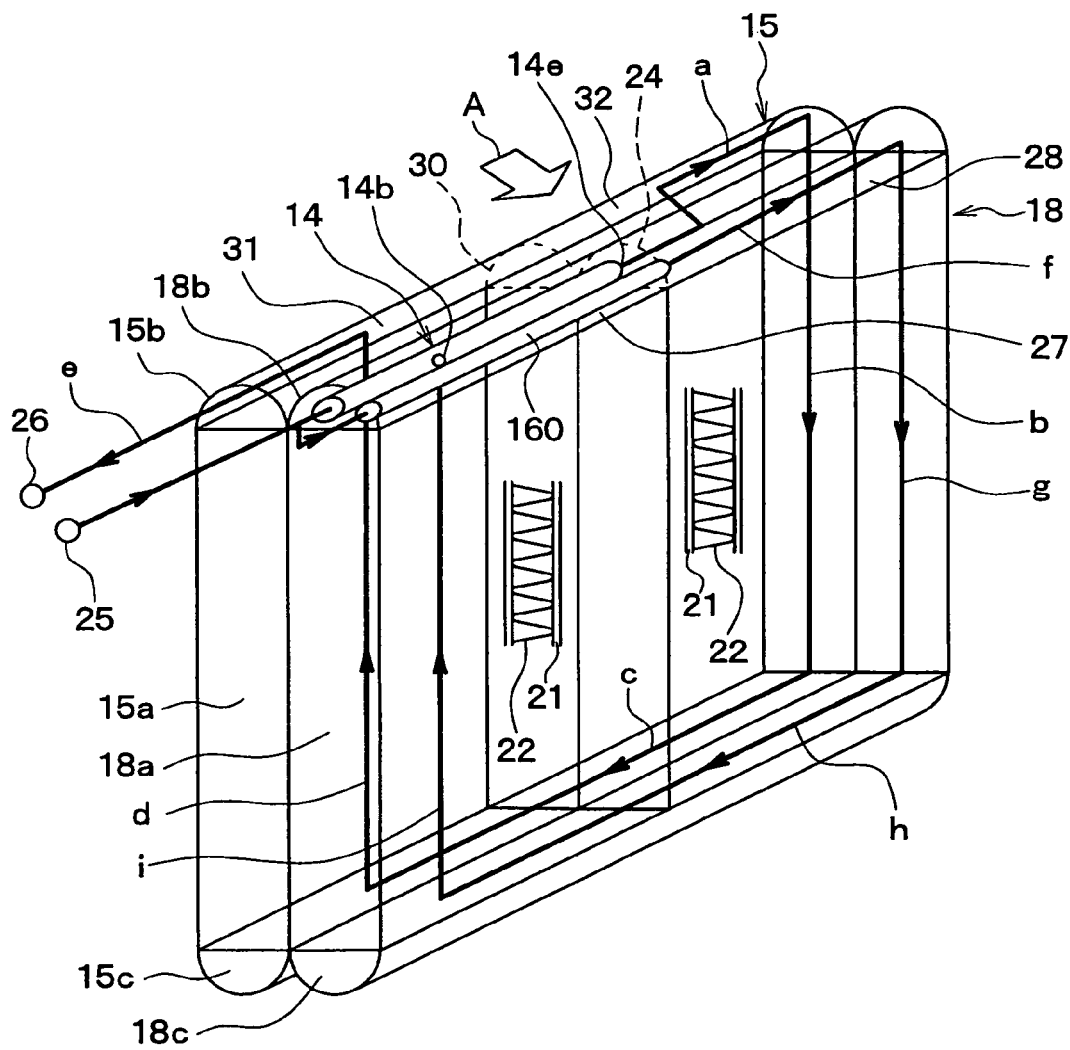
FIG. 16 is a perspective view showing a schematic structure of an integrated unit in an example 2.
Figure 17:
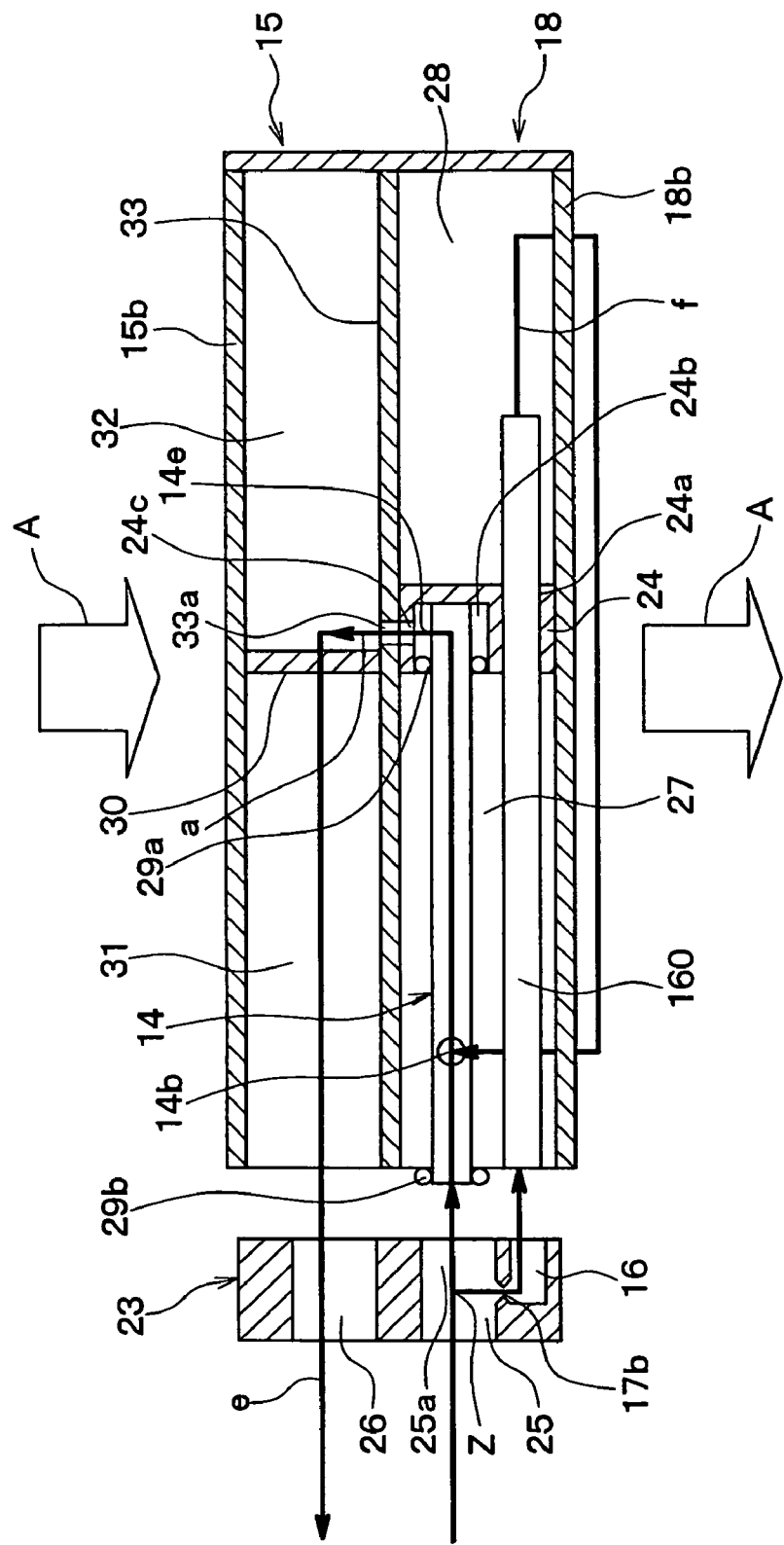
FIG. 17 is a schematic cross-sectional view of an evaporator tank of the integrated unit of FIG. 16.
Figure 18:
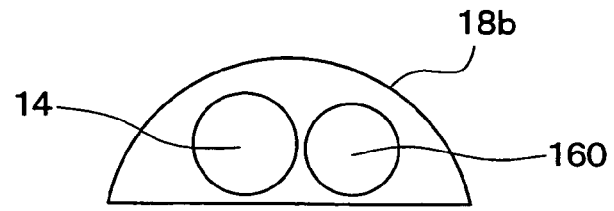
FIG. 18 is a side view of the evaporator tank of FIG. 17.

FIGS. 16 to 18 correspond to a modified example 2 of the above-described first embodiment. In the above-described embodiment, the capillary tube 17a is disposed between the branch passage 16 of the first connection block 23 of the integrated unit 20, and the inlet side of the second evaporator 18, and the refrigerant at the inlet of the second evaporator 18 is decompressed by the capillary tube 17a. In the example 2 shown in FIGS. 16 to 18, the capillary tube 17a is not employed as the decompression means of the second evaporator 18, and instead, a fixed throttle hole 17b, such as an orifice, for throttling a path area to a predetermined level is provided on the branch passage 16 of the first connection block 23, and together therewith, a connection pipe 160 whose passage diameter is larger than that of the capillary tube 17a is disposed at an arrangement position of the capillary tube 17a of the first embodiment.

The example 2 has the same refrigerant passages as those of the example 1 shown in FIGS. 13 to 15, except that the low-pressure refrigerant decompressed by the fixed throttle hole 17b formed on the branch passage 16 of the first connection block 23 is introduced into the right space 28 of the upper tank 18b of the second evaporator 18 through the connection pipe 160.

In the ejector refrigerant cycle device of the example 2, the other parts can be made similarly to those of the above-described first embodiment.

Second Embodiment

Figure 19:
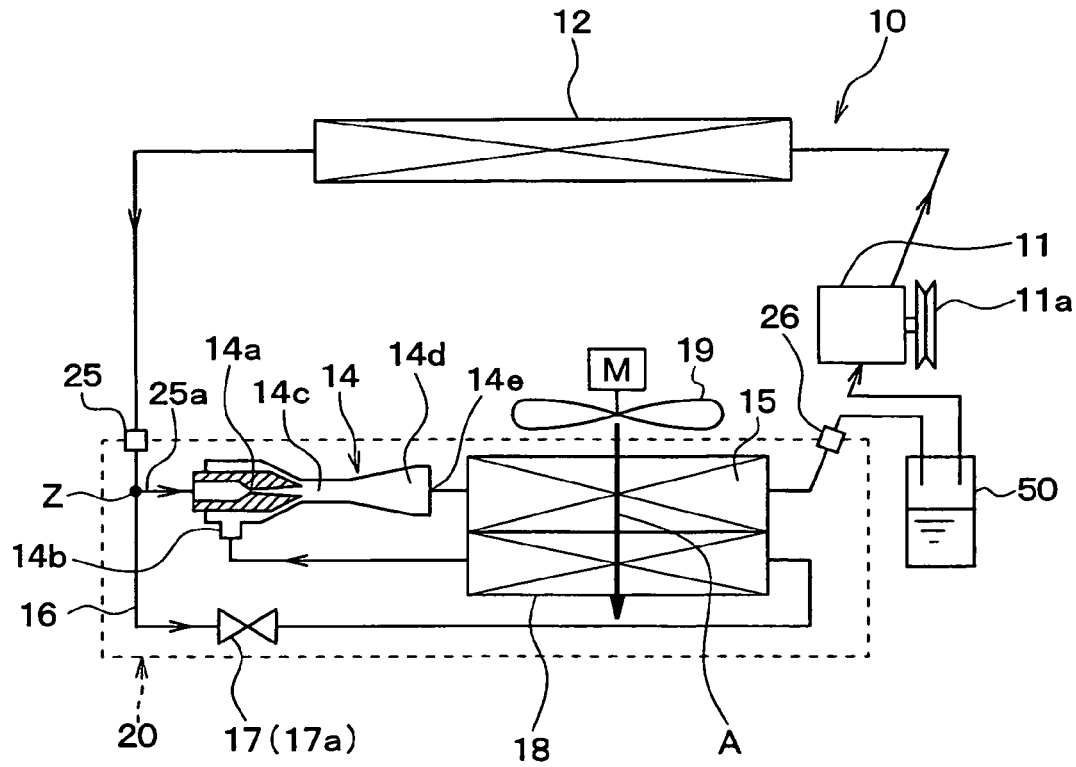
FIG. 19 is a refrigerant circuit diagram of an ejector refrigerant cycle device for a vehicle according to a second embodiment of the present invention.

In the first embodiment, the expansion valve type cycle including the liquid receiver 12a on the outlet side of the radiator 12, and the expansion valve 13 disposed on the outlet side of the liquid receiver 12a is employed. However, in a second embodiment, as shown in FIG. 19, an accumulator 50 is provided which serves as a liquid-vapor separator for separating the refrigerant into liquid and vapor phases on the outlet side of the first evaporator 15, and for storing the excessive refrigerant in the form of liquid. The vapor-phase refrigerant is derived from the accumulator 50 into the suction side of the compressor 11.

In the accumulator cycle of the FIG. 19, a liquid-vapor interface between the vapor-phase refrigerant and the liquid-phase refrigerant in the accumulator 50 is formed, and hence it is not necessary to control the superheat degree of the refrigerant at the outlet of the first evaporator 15 by the expansion valve 13 like the first embodiment.

Since the liquid receiver 12a and the expansion valve 13 are deleted from the accumulator cycle, the refrigerant inlet 25 of the integrated unit 20 may be directly connected to the outlet side of the radiator 12. The refrigerant outlet 26 of the integrated unit 20 may be connected to the inlet side of the accumulator 50, and the outlet side of the accumulator 50 may be directly connected to the suction side of the compressor 11.

In the second embodiment, the other parts can be made similarly to the above-described first embodiment or the examples thereof.

Third Embodiment

Figure 20:
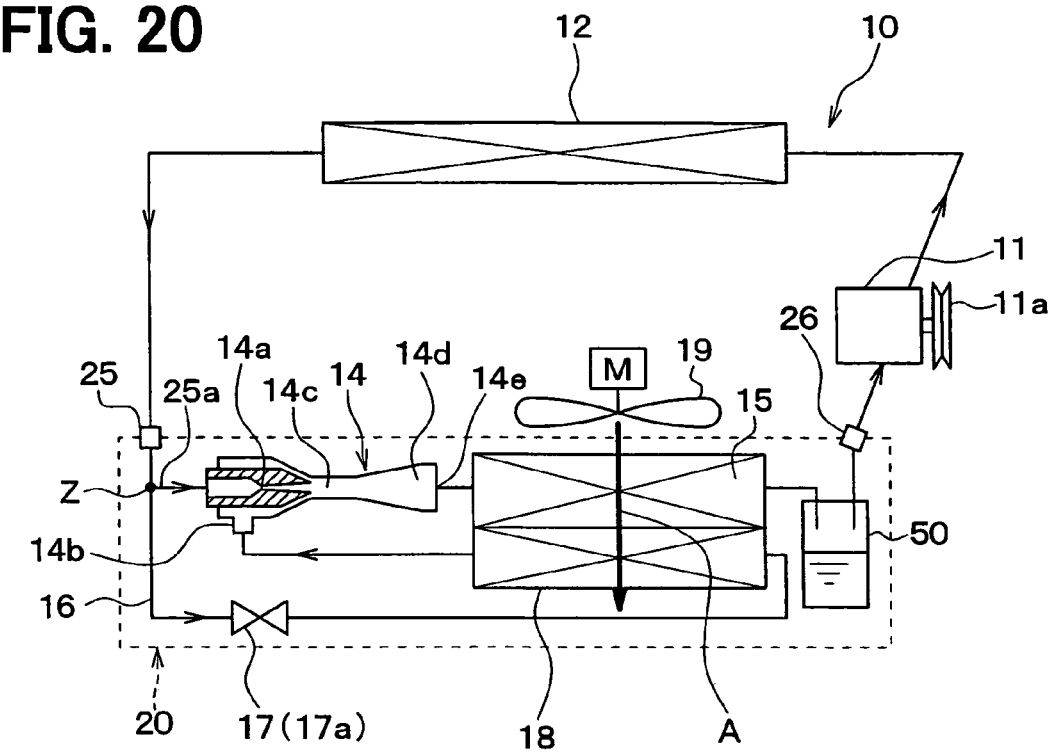
FIG. 20 is a refrigerant circuit diagram of an ejector refrigerant cycle device for a vehicle according to a third embodiment of the present invention.

The third embodiment is a modified one from the second embodiment. As shown in FIG. 20, the accumulator 50 is integrally incorporated into the integrated unit 20 as one element. The outlet part of the accumulator 50 constitutes the refrigerant outlet 26 of the entire integrated unit 20. In the third embodiment, the other parts can be made similarly to the above-described second embodiment.

Fourth Embodiment

Figure 21:
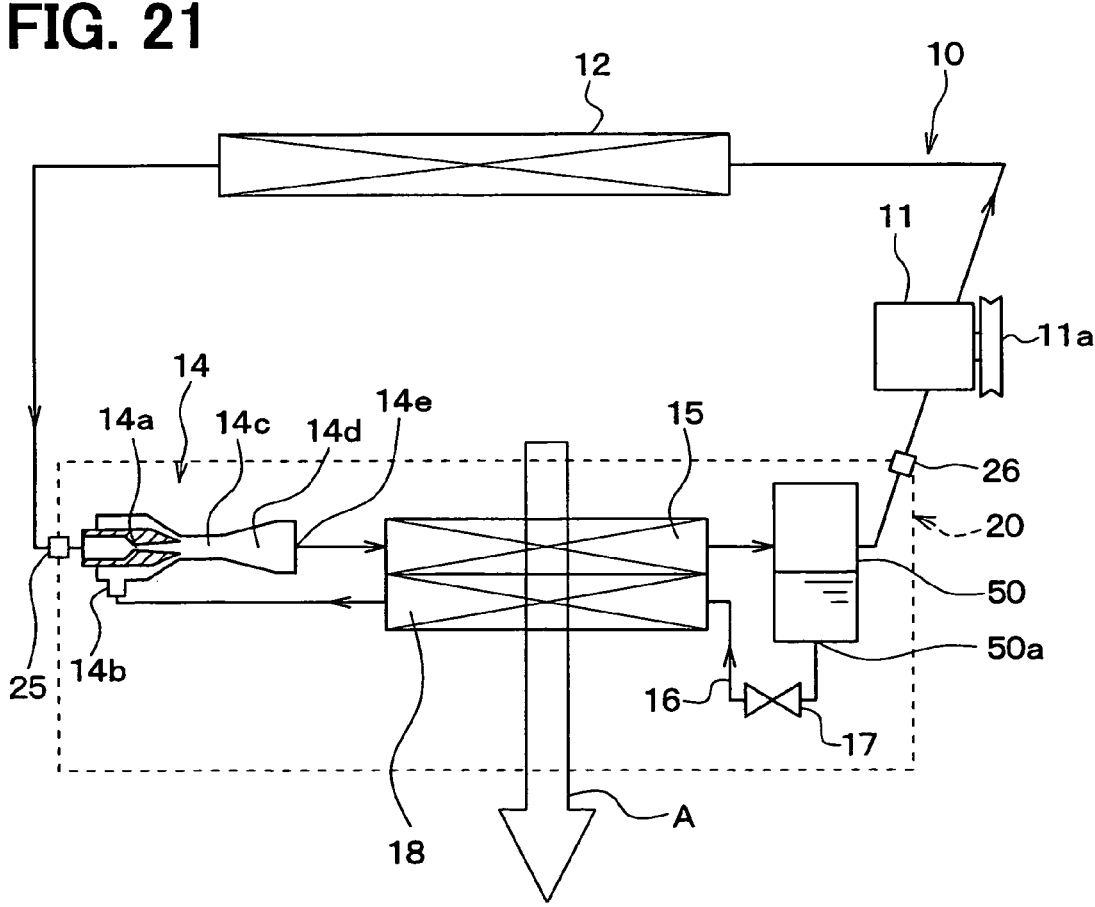
FIG. 21 is a refrigerant circuit diagram of an ejector refrigerant cycle device for a vehicle according to a fourth embodiment of the present invention.

In any one of the above-described first to third embodiments, the branch passage 16 branching on the inlet side of the ejector 14 is connected to the refrigerant suction port 14b of the ejector 14, and the throttle 17 and the second evaporator 18 are disposed on the branch passage 16. However, in the fourth embodiment, as shown in FIG. 21, the accumulator 50 serving as the liquid-vapor separator is disposed at the outlet side of the first evaporator 15, the branch passage 16 is provided for connecting the liquid-phase refrigerant outlet part 50a of the accumulator 50 to the refrigerant suction port 14b of the ejector 14, and the throttle 17 and the second evaporator 18 are disposed in the branch passage 16.

In the fourth embodiment, the ejector 14, the first and second evaporators 15 and 18, the throttle 17 and the accumulator 50 constitute an integrated unit 20. In the entire integrated unit 20, one refrigerant inlet 25 is provided at the inlet of the ejector 14, which is connected to the outlet of the radiator 12.

In the entire integrated unit 20, one refrigerant outlet 26 is provided at the vapor-phase refrigerant outlet of the accumulator 50, and connected to the suction side of the compressor 11.

In the fourth embodiment, the other parts may be made similarly to the first embodiment or examples of the first embodiments.

Fifth Embodiment

In any one of the above-described first to fourth embodiments, the throttle 17 is incorporated in the integrated unit 20.

Figure 22:
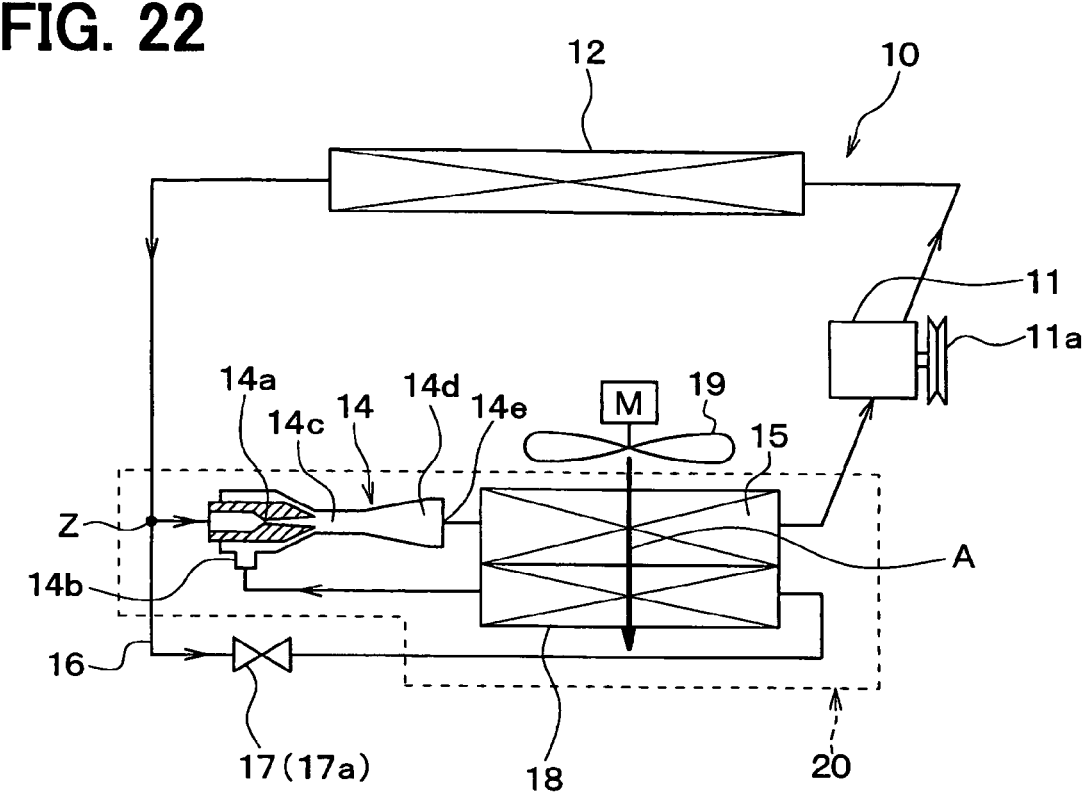
FIG. 22 is a refrigerant circuit diagram of an ejector refrigerant cycle device for a vehicle according to a fifth embodiment of the present invention.

However, in the fifth embodiment, as shown in FIG. 22, the integrated unit 20 is constructed with the first and second evaporators 15 and 18 and the ejector 14, and the throttle 17 is independently provided separately from the integrated unit 20.

Also, in the fifth embodiment, neither on the high-pressure side nor the low-pressure side of the cycle, the liquid-vapor separator is disposed, as shown in FIG. 22.

Sixth Embodiment

Figure 23:
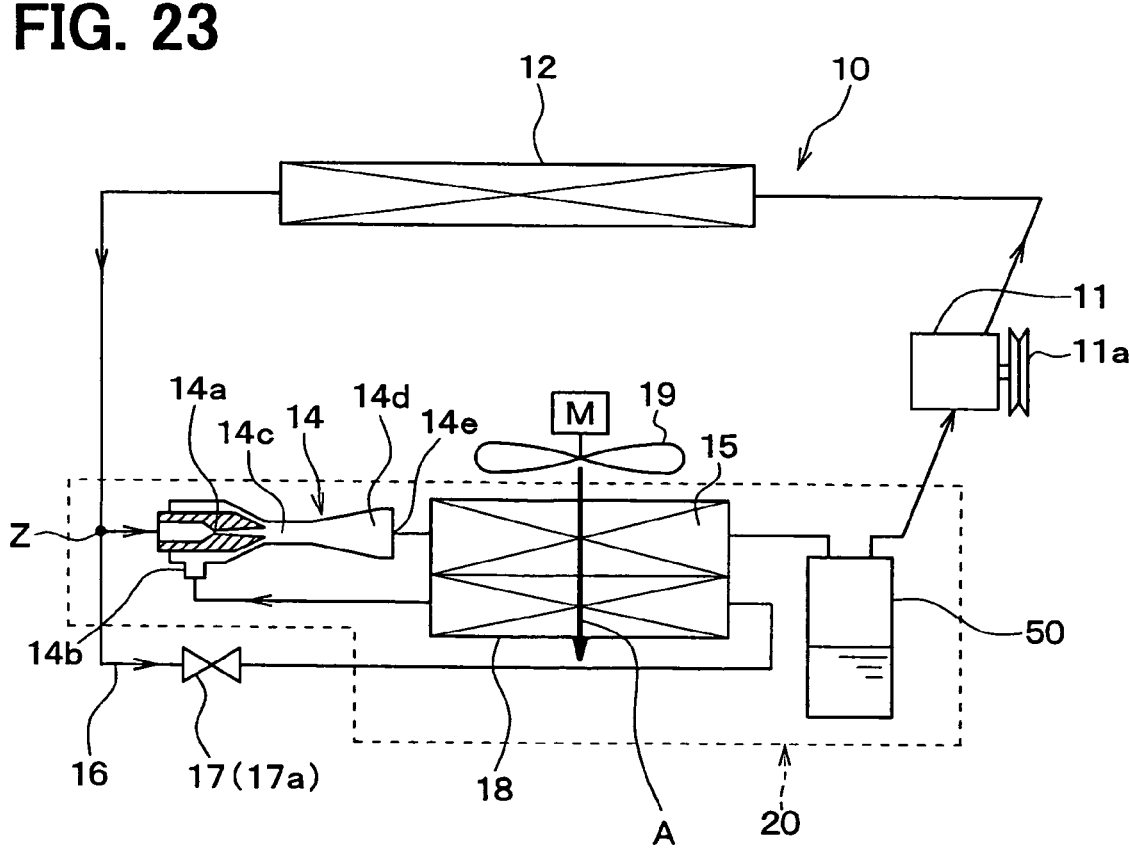
FIG. 23 is a refrigerant circuit diagram of an ejector refrigerant cycle device for a vehicle according to a sixth embodiment of the present invention.

FIG. 23 illustrates the sixth embodiment, in which the accumulator 50 serving as the liquid-vapor separator is provided on the outlet side of the first evaporator 15 with respect to the fifth embodiment, and is integrally incorporated in the integrated unit 20. That is, in the sixth embodiment, the ejector 14, the first and second evaporators 15 and 18, and the accumulator 50 constitute the integrated unit 20, and the throttle 17 is independently provided separately from the integrated unit 20.

Even in the sixth embodiment, the other parts may be similar to those of the first embodiment and examples of the first embodiments.

Other Embodiments

It should be understood that the invention is not limited to the above-mentioned embodiments, and various modifications can be made to the embodiments as follows.

(1) In the first embodiment, in integrally assembling each component of the integrated unit 20, the components other than the ejector 14, that is, the first evaporator 15, the second evaporator 18, the connection block 23, the capillary tube 17a, and the like are brazed integrally with each other. The integral assembly of these components can also be performed by various fixing means other than brazing, including screwing, caulking, welding, adhesion, and the like.

Although in the first embodiment, the exemplary fixing means of the ejector 14 is the screwing, any fixing means other than the screwing can be used as long as the fixing means may not cause thermal deformation. More specifically, the fixing means, such as caulking, or adhesion, may be used to fix the ejector 14.

(2) Although in the above-mentioned respective embodiments, the vapor-compression subcritical refrigerant cycle has been described in which the refrigerant is a flon-based one, an HC-based one, or the like, whose high pressure does not exceed the critical pressure, the invention may be applied to a vapor-compression supercritical refrigerant cycle which employs the refrigerant, such as carbon dioxide ($CO_2$), whose high pressure exceeds the critical pressure.

Note that in the supercritical cycle, only the refrigerant discharged by the compressor dissipates heat in the supercritical state at the radiator 12, and hence is not condensed. Thus, the liquid receiver 12a disposed on the high-pressure side cannot exhibit a liquid-vapor separation effect of the refrigerant, and a retention effect of the excessive liquid refrigerant. As shown in FIGS. 34 to 23, the supercritical cycle may have the structure including the accumulator 50 at the outlet of the first evaporator 15 for serving as the low-pressure liquid-vapor separator.

(3) Although in the above-mentioned embodiments, the throttle 17 is constructed by the fixed throttle hole 17b, such as the capillary tube 17a or the orifice, the throttle 17 may be constructed by an electric control valve whose valve opening (in which an opening degree of a passage restriction) is adjustable by the electric actuator. The throttle 17 may be composed of a combination of the fixed throttle, such as the capillary tube 17a, and the fixed throttle hole 17b, and an electromagnetic valve.

(4) Although in the above-mentioned respective embodiments, the exemplary ejector 14 is a fixed ejector having the nozzle part 14a with the certain path area, the ejector 14 for use may be a variable ejector having a variable nozzle part whose path area is adjustable.

For example, the variable nozzle part may be a mechanism which is designed to adjust the path area by controlling the position of a needle inserted into a passage of the variable nozzle part using the electric actuator.

(5) Although in the first embodiment and the like, the invention is applied to the refrigeration cycle device adapted for cooling the interior of the vehicle and for the freezer and refrigerator, both the first evaporator 15 whose refrigeration evaporation temperature is high and the second evaporator 18 whose refrigeration evaporation temperature is low may be used for cooling different areas inside the compartment of the vehicle (for example, an area on a front seat side inside the compartment of the vehicle, and an area on a back seat side therein).

Alternatively or additionally, both the first evaporator 15 whose refrigeration evaporation temperature is high and the second evaporator 18 whose refrigeration evaporation temperature is low may be used for cooling the freezer and refrigerator. That is, a refrigeration chamber of the freezer and refrigerator may be cooled by the first evaporator 15 whose refrigeration evaporation temperature is high, while a freezing chamber of the freezer and refrigerator may be cooled by the second evaporator 18 whose refrigeration evaporation temperature is low.

(6) Although in the first embodiment and the like, the thermal expansion valve 13 and the temperature sensing part 13a are separately provided from the unit for the ejector refrigerant cycle device, the thermal expansion valve 13 and the temperature sensing part 13a may be integrally incorporated in the unit for the ejector refrigerant cycle device. For example, a mechanism for accommodating the thermal expansion valve 13 and the temperature sensing part 13a in the connection block 23 of the integrated unit 20 can be employed. In this case, the refrigerant inlet 25 is positioned between the liquid receiver 12a and the thermal expansion valve 13, and the refrigerant outlet 26 is positioned between the compressor 11 and a passage part on which the temperature sensing part 13a is installed.

(7) It is apparent that although in the above-mentioned respective embodiments, the refrigeration cycle device for the vehicle has been described, the invention can be applied not only to the vehicle, but also to a fixed refrigeration cycle or the like in the same way.

(8) In the above-described first embodiment, the ejector 14 is located in the upper tank 18b of the second evaporator 18, and the downstream side end 17d of the capillary tube 17a is located in the upper tank 18b of the second evaporator 18. However, the ejector 14 may be located in the upper tank 15b of the first evaporator 15, and the downstream side end 17d of the capillary tube 17a may be located in the upper tank 15b of the first evaporator 15. In this case, the upper and lower partition plate 67 is located in the right space 32 of the upper tank 15b of the first evaporator 15 so as to partition the right space 32 into an upper space and a lower space. Furthermore, the downstream side end 17d of the capillary tube 17a is communicated with the upper tank 18b of the second evaporator 18 via the upper space of the right space 32, and the lower space of the right space 32 is communicated with the ejector tip end 14e. Accordingly, the refrigerant discharged from the ejector 14 can be distributed into the tubes 21 of the second evaporator 18 through the lower space of the right space 32, and the refrigerant flowing out of the downstream side end 17d of the capillary tube 17a can be introduced toward the tubes 21 of the second evaporator 18 through the upper space of the right space 32.

(9) In the above-described first embodiment, the ejector 14 is located in the upper tank 18b of the second evaporator 18. However, the ejector 14 may be located outside the upper tank 18b of the second evaporator 18.

(10) Although in the above-described first embodiment, the downstream side end 17d of the capillary tube 17a is inserted horizontally into the upper tank 18b, the downstream side end 17d of the capillary tube 17a may be inserted vertically into the upper tank 18b. In this case, the dimension of the integrated unit 20 in the tank longitudinal direction (i.e., laminating direction of the tubes 21) can be reduced.

(11) In the above-described first embodiment, the tanks 15b, 15c, 18b, and 18c of the first evaporator 15 and the second evaporator 18 are disposed on both the upper and lower sides of the first and second evaporators 15, 18, that is, the first evaporator 15 and the second evaporator 18 are disposed vertically. Alternatively, the first evaporator 15 and the second evaporator 18 may be disposed in a slanted manner with respect to the vertical direction.

Such changes and modifications are to be understood as being within the scope of the present invention as defined by the appended claims.

What is claimed is:

1. A unit for a refrigerant cycle device, comprising:
an ejector that has a nozzle part which decompresses refrigerant, and a refrigerant suction port from which refrigerant is drawn by a high-speed refrigerant flow jetted from the nozzle part, wherein the refrigerant jetted from the nozzle part and the refrigerant drawn from the refrigerant suction port are mixed and discharged from an outlet of the ejector;
a first evaporator connected to the outlet of the ejector, the first evaporator having a heat exchanging part for evaporating the refrigerant flowing out of the outlet of the ejector; and
a second evaporator connected to the refrigerant suction port of the ejector, the second evaporator having a heat exchanging part for evaporating the refrigerant to be drawn into the refrigerant suction port, wherein:
the first evaporator and the second evaporator are arranged adjacent to each other to respectively have a first tank and a second tank adjacent to each other;
one of the first tank and the second tank has a tank structure that is partitioned into a first space into which the refrigerant discharged from the outlet of the ejector flows, a second space and a third space;
the second space and the third space are provided to distribute the refrigerant into and to collect the refrigerant from a plurality of refrigerant passages of the heat exchanging part of the one of the first tank and the second tank, respectively;
the first space communicates directly with a tank space of the other one of the first tank and the second tank such that the refrigerant flowing out of the ejector flows into the tank space of the other one of the first tank and the second tank via the first space; and
the refrigerant suction port of the ejector communicates with the third space into which the refrigerant passing through the refrigerant passages of the heat exchanging part of the one of the first tank and the second tank is collected.

2. The unit according to claim 1, wherein the second tank has the tank structure.

3. The unit according to claim 2, wherein the first space is provided with a communication hole communicating with the first evaporator, such that the refrigerant flowing from the outlet of the ejector into the first space flows toward the first evaporator through the communication hole.

4. The unit according to claim 3, wherein the communication hole has a plurality of hole parts that are arranged in a flow direction of the refrigerant flowing into the first space from the outlet of the ejector.

5. The unit according to claim 3, wherein the communication hole is elongated in a flow direction of the refrigerant flowing into the first space from the outlet of the ejector.

6. The unit according to claim 2, wherein:
the second space has one space part extending in an arrangement direction of the refrigerant passages of the heat exchanging part of the second evaporator at a position adjacent to the refrigerant passages of the heat exchanging part of the second evaporator; and
the first space is provided on a side opposite to the refrigerant passages of the heat exchanging part of the second evaporator with respect to the one space part of the second space.

7. The unit according to claim 6, wherein the second space has another space part extending from the one space part to a position on an extending line of the first space.

8. The unit according to claim 6, wherein the tank structure of the second tank further includes a partition plate that is disposed within the tank to partition an inner space of the tank into the first space and the second space.

9. The unit according to claim 7, wherein:
the tank structure further includes a partition plate disposed within the tank and having a plate surface part facing the refrigerant passages;
the partition plate includes a flexed plate flexed from the plate surface part of the partition plate to the side opposite to the refrigerant passages of the heat exchanging part of the second evaporator; and
the first and second spaces are partitioned from each other by the plate surface part and the flexed plate.

10. The unit according to claim 9, wherein the partition plate has a rib for preventing a deformation of the flexed plate.

11. The unit according to claim 1, wherein:
the ejector is located in the tank; and
the outlet of the ejector is opened directly in the first space of the tank.

12. The unit according to claim 8, wherein:
the ejector is located in the tank;
the outlet of the ejector is opened directly in the first space of the tank; and
a plate surface part has a recess recessed toward the second space for smoothly flowing the refrigerant from the outlet of the ejector to the first space of the tank.

13. The unit according to claim 1, wherein the first evaporator is located at an upstream side in an air flow direction, and the second evaporator is located downstream from the first evaporator in the air flow direction.

14. The unit according to claim 1, wherein the first evaporator, the second evaporator and the ejector are integrated to form an integrated unit.

15. The unit according to claim 1, wherein the second space is provided with an inlet port for introducing therein the refrigerant to be drawn into the suction port of the ejector, the unit further comprising a throttle mechanism, located at an upstream side of the inlet port in a refrigerant flow, for decompressing the refrigerant to be drawn into the refrigerant suction port of the ejector.

16. The unit according to claim 14, wherein the second space is provided with an inlet port for introducing therein the refrigerant to be drawn into the suction port of the ejector, the unit further comprising
a throttle mechanism located at an upstream side of the inlet port in a refrigerant flow for decompressing the refrigerant,
wherein the throttle mechanism is incorporated in the integrated unit.

17. The unit according to claim 1, wherein the ejector further includes a mixing part into which the refrigerant jetted from the nozzle part and the refrigerant drawn from the refrigerant suction port are mixed, and a pressure-increasing part in which a speed energy of the refrigerant from the mixing part is converted to a pressure energy.

18. The unit according to claim 1, wherein the first space is disposed above the second space.

19. The unit according to claim 1, wherein the refrigerant flows from the second space directly into the plurality of refrigerant passages and the refrigerant flows from the plurality of refrigerant passages directly into the third space.

20. The unit according to claim 1, wherein the first tank is located at only one end of the heat exchanging part of the first evaporator and the second tank is located at only one end of the heat exchanging part of the second evaporator.

21. The unit according to claim 1, wherein the first space communicates directly with the tank space of the other one of the first tank and the second tank.

22. A refrigerant cycle device comprising:
a compressor for compressing refrigerant;
a radiator for cooling the refrigerant from the compressor;
an ejector that has a nozzle part for decompressing the refrigerant from the radiator, and a refrigerant suction port from which refrigerant is drawn by a high-speed refrigerant flow jetted from the nozzle part, wherein the refrigerant jetted from the nozzle part and the refrigerant drawn from the refrigerant suction port are mixed and discharged from an outlet of the ejector;
a first evaporator connected to the outlet of the ejector, for evaporating the refrigerant flowing out of the outlet of the ejector; and
a second evaporator connected to the refrigerant suction port of the ejector, wherein:
the second evaporator includes a plurality of tubes in which the refrigerant to be drawn into the refrigerant suction port flows, and a tank extending in an arrangement direction of the tubes;
the first evaporator and the second evaporator are arranged adjacent to each other to respectively have a first tank and a second tank adjacent to each other;
one of the first tank and the second tank has a tank structure that is partitioned into a first space into which the refrigerant discharged from the outlet of the ejector flows, a second space and a third space;
the second space and the third space are provided to distribute the refrigerant into and to collect the refrigerant from a plurality of refrigerant passages of the heat exchanging part of the one of the first tank and the second tank, respectively;
the first space communicates directly with a tank space of the other one of the first tank and the second tank such that the refrigerant flowing out of the ejector flows into the tank space of the other one of the first tank and the second tank via the first space; and
the refrigerant suction port of the ejector communicates with the third space into which the refrigerant passing through the refrigerant passages of the heat exchanging part of the one of the first tank and the second tank is collected.

23. The refrigerant cycle device according to claim 22, wherein the second space is provided with an inlet port for introducing therein the refrigerant to be drawn into the refrigerant suction port of the ejector, the refrigerant cycle device further comprising
a throttle mechanism, located at an upstream side of the inlet port in a refrigerant flow, for decompressing the refrigerant to be drawn into the refrigerant suction port.

24. The refrigerant cycle device according to claim 22, wherein:
the ejector is located in the tank; and
the outlet of the ejector is opened directly in the first space of the tank.

25. The refrigerant cycle device according to claim 22, wherein the first space is disposed above the second space.

26. The refrigerant cycle device according to claim 22, wherein the refrigerant flows from the second space directly into the plurality of refrigerant passages and the refrigerant flows from the plurality of refrigerant passages directly into the third space.

27. The refrigerant cycle device according to claim 22, wherein the first tank is located at only one end of the heat exchanging part of the first evaporator and the second tank is located at only one end of the heat exchanging part of the second evaporator.

28. The refrigerant cycle device according to claim 22, wherein the first space communicates directly with the tank space of the other one of the first tank and the second tank.

* * * * *

UNITED STATES PATENT AND TRADEMARK OFFICE
CERTIFICATE OF CORRECTION

PATENT NO. : 7,654,108 B2
APPLICATION NO. : 11/654206
DATED : February 2, 2010
INVENTOR(S) : Ishizaka et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 308 days.

Signed and Sealed this

Twenty-third Day of November, 2010

David J. Kappos
*Director of the United States Patent and Trademark Office*